US009635348B2

(12) United States Patent
McNamer et al.

(10) Patent No.: US 9,635,348 B2
(45) Date of Patent: *Apr. 25, 2017

(54) METHODS, SYSTEMS, AND COMPUTER-READABLE STORAGE MEDIA FOR SELECTING IMAGE CAPTURE POSITIONS TO GENERATE THREE-DIMENSIONAL IMAGES

(71) Applicant: 3D Media Corporation, Research Triangle Park, NC (US)

(72) Inventors: Michael McNamer, Apex, NC (US); Marshall Robers, Durham, NC (US); Tassos Markas, Chapel Hill, NC (US); Jason Paul Hurst, Cary, NC (US)

(73) Assignee: 3D Media Corporation, Research Triangle Park, NC (US)

( * ) Notice: Subject to any disclaimer, the term of this patent is extended or adjusted under 35 U.S.C. 154(b) by 446 days.

This patent is subject to a terminal disclaimer.

(21) Appl. No.: 14/447,578

(22) Filed: Jul. 30, 2014

(65) Prior Publication Data

US 2015/0103149 A1 Apr. 16, 2015

Related U.S. Application Data

(63) Continuation of application No. 13/865,312, filed on Apr. 18, 2013, now Pat. No. 8,810,635, which is a continuation of application No. 12/842,171, filed on Jul. 23, 2010, now Pat. No. 8,436,893.

(60) Provisional application No. 61/230,133, filed on Jul. 31, 2009.

(51) Int. Cl.
*H04N 13/02* (2006.01)
*G06T 7/00* (2017.01)
*H04N 5/232* (2006.01)

(52) U.S. Cl.
CPC ....... *H04N 13/0221* (2013.01); *G06T 7/0075* (2013.01); *H04N 5/23222* (2013.01); *H04N 5/23293* (2013.01); *H04N 13/0296* (2013.01); *G06T 2200/24* (2013.01); *G06T 2207/20061* (2013.01)

(58) Field of Classification Search
None
See application file for complete search history.

(56) References Cited

U.S. PATENT DOCUMENTS

| | | | | | |
|---|---|---|---|---|---|
| 5,530,774 | A | * | 6/1996 | Fogel | 382/154 |
| 5,548,667 | A | * | 8/1996 | Tu | 382/285 |
| 5,561,718 | A | * | 10/1996 | Trew et al. | 382/118 |
| 5,682,563 | A | * | 10/1997 | Shinohara et al. | 396/287 |

(Continued)

*Primary Examiner* — Peter D Le
(74) *Attorney, Agent, or Firm* — Olive Law Group, PLLC

(57) ABSTRACT

Methods, systems, and computer program products for selecting image capture positions to generate three-dimensional images are disclosed herein. According to one aspect, a method includes determining a plurality of first guides associated with a first still image of a scene. The method can also include displaying a real-time image of the scene on a display. Further, the method can include determining a plurality of second guides associated with the real-time image. The method can also include displaying the first and second guides on the display for guiding selection of a position of an image capture device to capture a second still image of the scene for pairing the first and second still images as a stereoscopic pair of a three-dimensional image.

11 Claims, 19 Drawing Sheets

(56) References Cited

U.S. PATENT DOCUMENTS

| | | | | |
|---|---|---|---|---|
| 5,719,954 A | * | 2/1998 | Onda | 382/154 |
| 5,748,199 A | * | 5/1998 | Palm | 345/473 |
| 7,116,324 B2 | * | 10/2006 | Kaye et al. | 345/419 |
| 7,164,790 B2 | * | 1/2007 | Zhang et al. | 382/154 |
| 7,181,061 B2 | * | 2/2007 | Kawano et al. | 382/154 |
| 7,215,809 B2 | * | 5/2007 | Sato et al. | |
| 7,466,336 B2 | * | 12/2008 | Regan et al. | 348/50 |
| 7,639,838 B2 | * | 12/2009 | Nims | 382/103 |
| 2004/0135780 A1 | * | 7/2004 | Nims | 345/419 |
| 2005/0191048 A1 | * | 9/2005 | Ramadan | 396/329 |
| 2006/0203335 A1 | * | 9/2006 | Martin et al. | 359/462 |
| 2006/0222260 A1 | * | 10/2006 | Sambongi et al. | 382/274 |
| 2007/0024614 A1 | * | 2/2007 | Tam et al. | 345/419 |
| 2007/0165129 A1 | * | 7/2007 | Hill et al. | 348/335 |
| 2008/0043848 A1 | * | 2/2008 | Kuhn | 375/240.16 |
| 2008/0180550 A1 | * | 7/2008 | Gulliksson | 348/231.99 |
| 2009/0116732 A1 | * | 5/2009 | Zhou et al. | 382/154 |
| 2009/0290013 A1 | * | 11/2009 | Hayashi | 348/36 |

* cited by examiner

METHODS, SYSTEMS, AND COMPUTER-READABLE STORAGE MEDIA FOR SELECTING IMAGE CAPTURE POSITIONS TO GENERATE THREE-DIMENSIONAL IMAGES

CROSS REFERENCE TO RELATED APPLICATIONS

This is a continuation application which claims the benefit of U.S. patent application Ser. No. 13/865,312, filed Apr. 18, 2013, which claims the benefit of U.S. patent application Ser. No. 12/842,171, which claims the benefit of U.S. provisional patent application No. 61/230,133, filed Jul. 31, 2009, all the disclosures of which are incorporated herein by reference in their entireties. The disclosures of the following U.S. provisional patent applications, commonly owned and simultaneously filed Jul. 31, 2009, are all incorporated by reference in their entirety: U.S. provisional patent application No. 61/230,131; and U.S. provisional patent application No. 61/230,138.

TECHNICAL FIELD

The subject matter disclosed herein relates to generating an image of a scene. In particular, the subject matter disclosed herein relates to methods, systems, and computer-readable storage media for selecting image capture positions to generate three-dimensional images of a scene.

BACKGROUND

Stereoscopic, or three-dimensional, imagery is based on the principle of human vision. Two separate detectors detect the same object or objects in a scene from slightly different angles and project them onto two planes. The resulting images are transferred to a processor which combines them and gives the perception of the third dimension, i.e. depth, to a scene.

Many techniques of viewing stereoscopic images have been developed and include the use of colored or polarizing filters to separate the two images, temporal selection by successive transmission of images using a shutter arrangement, or physical separation of the images in the viewer and projecting them separately to each eye. In addition, display devices have been developed recently that are well-suited for displaying stereoscopic images. For example, such display devices include digital still cameras, personal computers, digital picture frames, set-top boxes, high-definition televisions (HDTVs), and the like.

The use of digital image capture devices, such as digital still cameras, digital camcorders (or video cameras), and phones with built-in cameras, for use in capturing digital images has become widespread and popular. Because images captured using these devices are in a digital format, the images can be easily distributed and edited. For example, the digital images can be easily distributed over networks, such as the Internet. In addition, the digital images can be edited by use of suitable software on the image capture device or a personal computer.

Digital images captured using conventional image capture devices are two-dimensional. It is desirable to provide methods and systems for using conventional devices for generating three-dimensional images. In addition, it is desirable to provide methods and systems for aiding users of image capture devices to select appropriate image capture positions for capturing two-dimensional images for use in generating three-dimensional images.

SUMMARY

Methods, systems, and computer program products for selecting image capture positions to generate three-dimensional images are disclosed herein. According to one aspect, a method includes determining a plurality of first guides associated with a first still image of a scene. The method can also include displaying a real-time image of the scene on a display. Further, the method can include determining a plurality of second guides associated with the real-time image. The method can also include displaying the first and second guides on the display for guiding selection of a position of an image capture device to automatically or manually capture a second still image of the scene, as well as any images between in case the image capture device is set in a continuous image capturing mode, for pairing any of the captured images as a stereoscopic pair of a three-dimensional image.

According to another aspect, a user can, by use of the subject matter disclosed herein, use an image capture device for capturing a plurality of different images of the same scene and for generating a three-dimensional, or stereoscopic, image of the scene. The subject matter disclosed herein includes a process for generating three-dimensional images. The generation process can include identification of suitable pairs of images, registration, rectification, color correction, transformation, depth adjustment, and motion detection and removal. The functions of the subject matter disclosed herein can be implemented in hardware and/or software that can be executed on an image capture device or a suitable display device. For example, the functions can be implemented using a digital still camera, a personal computer, a digital picture frame, a set-top box, an HDTV, a phone, and the like.

According to an aspect, a system for selecting an image capture position to generate a three-dimensional image is disclosed. The system includes a memory having stored therein computer-executable instructions. The system also includes a computer processor that executes the computer-executable instructions. Further, the system may include an image generator configured to: determine a plurality of first guides associated with a first still image of a scene; and determine a plurality of second guides associated with the real-time image. The system may also include a display configured to: display a real-time image of the scene; and display the first and second guides for guiding selection of a position of an image capture device to capture a second still image of the scene, as well as any images in between, for pairing any of the captured images as a stereoscopic pair of a three-dimensional image.

According to another aspect, the image generator is configured to: determine at least one of a first horizontal guide, a first vertical guide, and a first perspective guide; and determine at least one of a second horizontal guide, a second vertical guide, and a second perspective guide.

According to another aspect, the image generator is configured to: apply edge sharpness criteria to identify the first template region to generate horizontal and vertical guides; and optionally apply a Hough transform or similar operation to identify the second horizontal, vertical, and perspective guide.

According to another aspect, the image generator is configured to capture the first still image using the image capture device, wherein the displaying of the real-time image of the scene occurs subsequent to capturing the first still image.

According to another aspect, the image generator is configured to receive input for entering a stereoscopic mode.

According to another aspect, the image generator is configured to: store settings of the image capture device used when the first still image is captured; and capture the second or other still images using the stored settings.

According to another aspect, the image generator is configured to dynamically change the displayed real-time image of the scene as the position of the image capture device changes with respect to the scene.

According to another aspect, the image generator is configured to dynamically change positioning of the first and second guides with respect to one another on the display as the position of the image capture device changes with respect to the scene.

According to another aspect, the image generator is configured to automatically or manually capture the second still image, or to stop capturing images when in continuous capture mode, when the first and second guides become aligned.

According to another aspect, the first and second guides become aligned when the image capture device is positioned using such predetermined criteria for pairing the first and second/last still images as the stereoscopic pair of the three-dimensional image.

According to an aspect, a system for positioning an image capture device for generating a three-dimensional image is disclosed. The system includes a memory having stored therein computer-executable instructions. The system also includes a computer processor that executes the computer-executable instructions. Further, the system may include an image generator configured to: determine a plurality of first guides associated with a first still image of a scene; capture at least one real-time image of the scene during movement of the image capture device; and determine a plurality of second guides associated with the real-time image. The system may also include a motorized device configured to: move the image capture device; and position the image capture device to a predetermined position where the guides are aligned to capture a second/last still image of the scene for pairing any of the captured images as a stereoscopic pair of a three-dimensional image.

According to another aspect, the image generator is configured to: determine at least one of a first horizontal guide, a first vertical guide, and a first perspective guide, and determine at least one of a second horizontal guide, a second vertical guide, and a second perspective guide.

According to another aspect, the image generator is configured to: apply edge sharpness criteria to identify the first template region to generate horizontal and vertical guides; and optionally apply a Hough transform or similar operation to identify the second horizontal, vertical, and perspective guide.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

Figure 1:
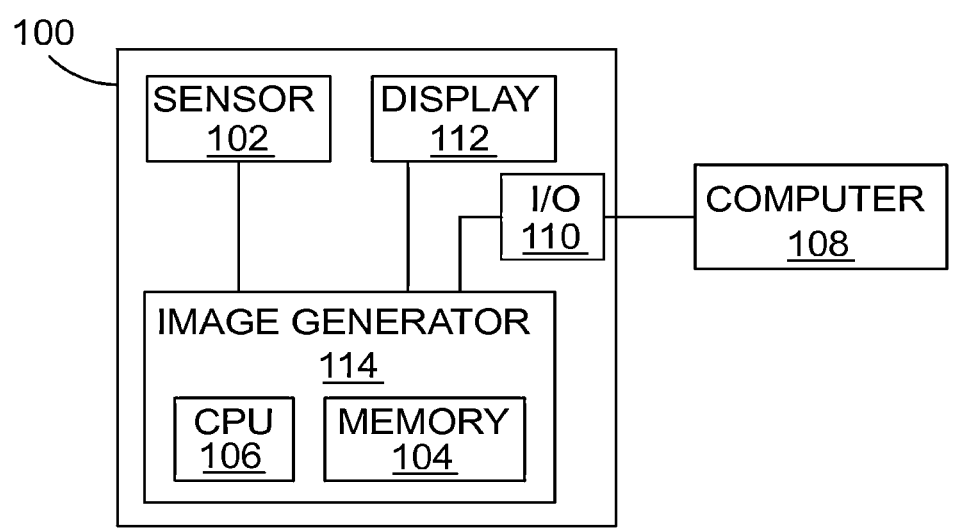
FIG. 1 is a block diagram of an exemplary device for creating three-dimensional images of a scene according to embodiments of the present invention.

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present invention are based on technology that allows a user to capture a plurality of different images of the same object within a scene and to generate one or more stereoscopic images using the different images. Particularly, methods in accordance with the present invention provide assistance to camera users in capturing pictures that can be subsequently converted into high-quality three-dimensional images. The functions disclosed herein can be implemented in hardware and/or software that can be executed within, for example, but not limited to, a digital still camera, a video camera (or camcorder), a personal computer, a digital picture frame, a set-top box, an HDTV, a phone, or the like. A mechanism to automate the image capture procedure is also described herein.

Methods, systems, and computer program products for selecting an image capture position to generate a three-dimensional image in accordance with embodiments of the present invention are disclosed herein. According to one or more embodiments of the present invention, a method includes determining a plurality of first guides associated with a first still image of a scene. The method can also include displaying a real-time image of the scene on a display. Further, the method can include determining a plurality of second guides associated with the real-time image. The method can also include displaying the first and second guides on the display for guiding selection of a position of an image capture device to automatically or manually capture a second still image of the scene, as well as any images in between in case the image capture device is set in a continuous image capturing mode, for pairing any of the captured images as a stereoscopic pair of a three-dimensional image. Such three-dimensional images can be viewed or displayed on a suitable stereoscopic display.

The functions and methods described herein can be implemented on a device capable of capturing still images, displaying three-dimensional images, and executing computer executable instructions on a processor. The device may be, for example, a digital still camera, a video camera (or camcorder), a personal computer, a digital picture frame, a set-top box, an HDTV, a phone, or the like. The functions of the device may include methods for rectifying and registering at least two images, matching the color and edges of the images, identifying moving objects, removing or adding moving objects from or to the images to equalize them, altering the perceived depth of objects, and any final display-specific transformation to create a single, high-quality three-dimensional image. The techniques described herein may be applied to still-captured images and video images, which can be thought of as a series of images; hence for the purpose of generalization the majority of the description herein is limited to still-captured image processing.

FIG. 1 illustrates a block diagram of an exemplary device 100 for generating three-dimensional images of a scene according to embodiments of the present invention. In this example, device 100 is a digital camera capable of capturing several consecutive, still digital images of a scene. In another example, the device 100 may be a video camera capable of capturing a video sequence including multiple still images of a scene. A user of the device 100 may position the camera in different positions for capturing images of different perspective views of a scene. The captured images may be suitably stored, analyzed and processed for generating three-dimensional images as described herein. For example, subsequent to capturing the images of the different perspective views of the scene, the device 100, alone or in combination with a computer, may use the images for generating a three-dimensional image of the scene and for displaying the three-dimensional image to the user.

Referring to FIG. 1, the device 100 includes a sensor array 102 of charge coupled device (CCD) sensors or CMOS sensors which may be exposed to a scene through a lens and exposure control mechanism as understood by those of skill in the art. The device 100 may also include analog and digital circuitry such as, but not limited to, a memory 104 for storing program instruction sequences that control the device 100, together with a CPU 106, in accordance with embodiments of the present invention. The CPU 106 executes the program instruction sequences so as to cause the device 100 to expose the sensor array 102 to a scene and derive a digital image corresponding to the scene. The digital image may be stored in the memory 104. All or a portion of the memory 104 may be removable, so as to facilitate transfer of the digital image to other devices such as a computer 108. Further, the device 100 may be provided with an input/output (I/O) interface 110 so as to facilitate transfer of digital image even if the memory 104 is not removable. The device 100 may also include a display 112 controllable by the CPU 106 and operable to display the images for viewing by a camera user.

Figure 2:
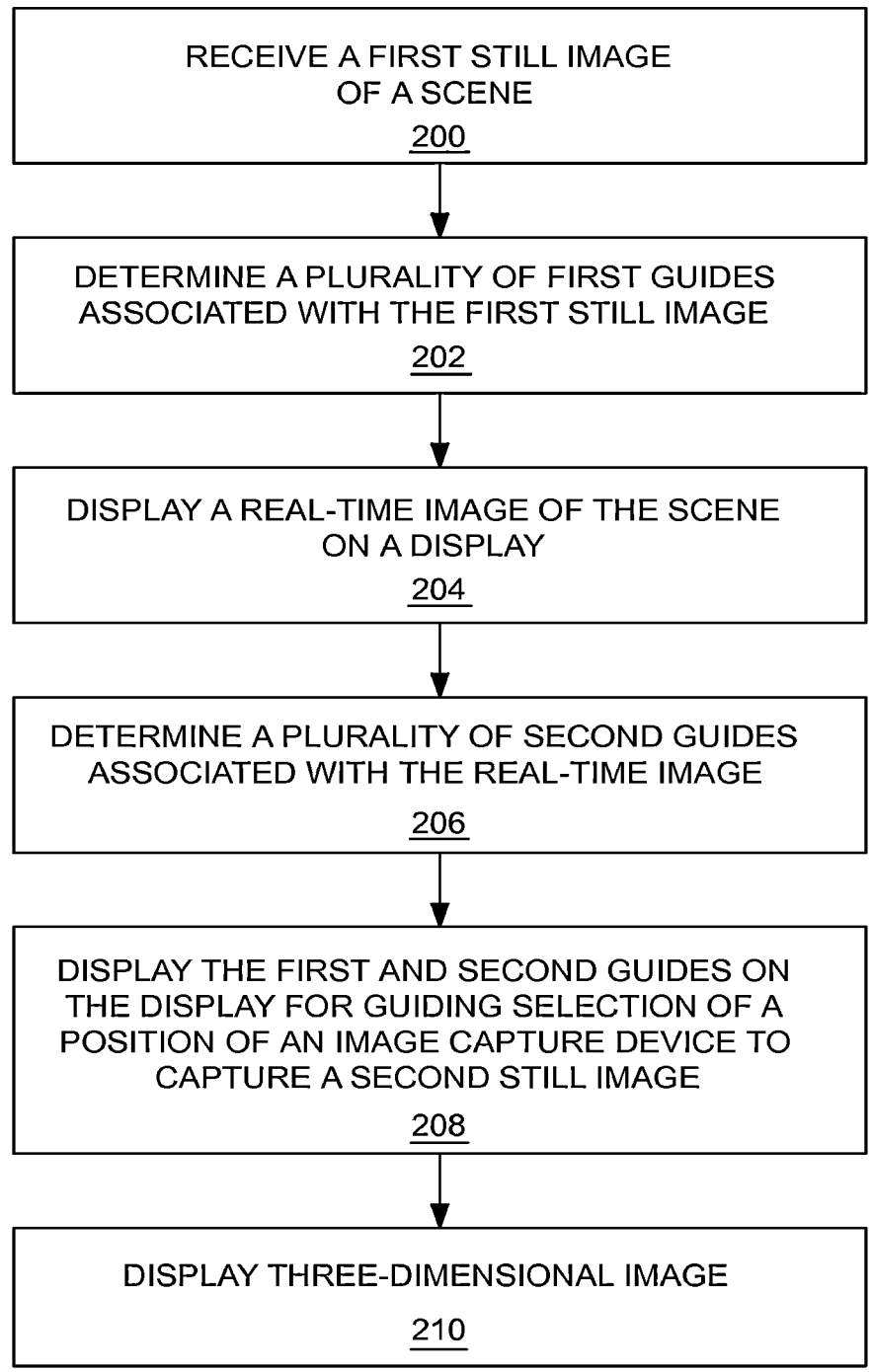
FIG. 2 is a flow chart of an exemplary method for generating a three-dimensional image of a scene using the device shown in FIG. 1, alone or together with any other suitable device described herein, in accordance with embodiments of the present invention.

The memory 104 and the CPU 106 may be operable together to implement an image generator function 114 for generating three-dimensional images in accordance with embodiments of the present invention. The image generator function 114 may generate a three-dimensional image of a scene using two or more images of the scene captured by the device 100. FIG. 2 illustrates a flow chart of an exemplary method for generating a three-dimensional image of a scene using the device 100, alone or together with any other suitable device, in accordance with embodiments of the present invention. In this example, the device 100 may be operating in a "stereoscopic mode" for assisting the camera user in generating high-quality, three-dimensional images of a scene. Referring to FIG. 2, the method includes receiving 200 a first still image of a scene to which the sensor array 102 is exposed. For example, the sensor array 102 may be used for capturing a still image of the scene. The still image and settings of the device 100 during capture of the image may be stored in memory 104. The CPU 106 may implement instructions stored in the memory 104 for storing the captured image in the memory 104.

The method of FIG. 2 includes determining 202 a plurality of first guides associated with the first still image. For example, depth detection and edge and feature point extraction may be performed on the first still image to identify a set of interest points (IP) for use in assisting the user to move the camera for capturing a second still image to be used for generating a three-dimensional image. Additional details of this technique are described in further detail herein.

The method of FIG. 2 includes displaying a real-time image of the scene on a display. For example, the device 100 may enter a live-view mode in which the user may direct the device 100 such that the sensor array 102 is exposed to a scene, and in this mode an image of the scene is displayed on the display 112 in real-time as understood by those of skill in the art. As the device 100 is moved, the real-time image displayed on the display 112 also moves in accordance with the movement of the device 100.

The method of FIG. 2 includes determining 206 a plurality of second guides associated with the real-time image. For example, for vertical and perspective alignment, a Hough transform for line identification may be applied, and the dominant horizontal and perspective lines in the two images (alternately colored) may be superimposed over the displayed real-time image in the live-view mode to assist the user in aligning the second picture vertically and for perspective. Further, a procedure to calculate required horizontal displacement, as described in more detail herein, may use the interest point set (IP) of the first image for performing a point correspondence operation to find similar points in the displayed real-time image as guidance for the capture of a second image.

The method of FIG. 2 includes displaying 208 the first and second guides on the display for guiding selection of a position of an image capture device to capture a second still image of the scene for pairing the first and second still images as a stereoscopic pair of a three-dimensional image. For example, an "alignment guide" may be displayed on the display 112, as described in more detail herein, for assisting a user to position the device 100 for capturing a second image of the scene that would be suitable to use with the first captured image for generation of a three-dimensional image. Once the device 100 is positioned in suitable alignment for capturing the second image, the user may then operate the device 100 for capturing the second image, such as, but not limited to, depressing an image capture button on the device 100. After the second image is captured, the first and second captured images may be suitably processed in accordance with embodiments of the present invention for generating a three-dimensional image. Other images may also be automatically captured between the time the first and second images are captured, and may also be used for generating a three-dimensional image. The method of FIG. 2 may include displaying 210 the three-dimensional image. For example, the image may be displayed on the display 112 or any other suitable display.

Although the above examples are described for use with a device capable of capturing images, embodiments of the present invention described herein are not so limited. Particularly, the methods described herein for assisting a camera user to generate a three-dimensional image of a scene may, for example, be implemented in any suitable system including a memory and computer processor. The memory may have stored therein computer-executable instructions. The computer processor may execute the computer-executable instructions. The memory and computer processor may be configured for implementing methods in accordance with embodiments of the present invention described herein.

Figure 3A:
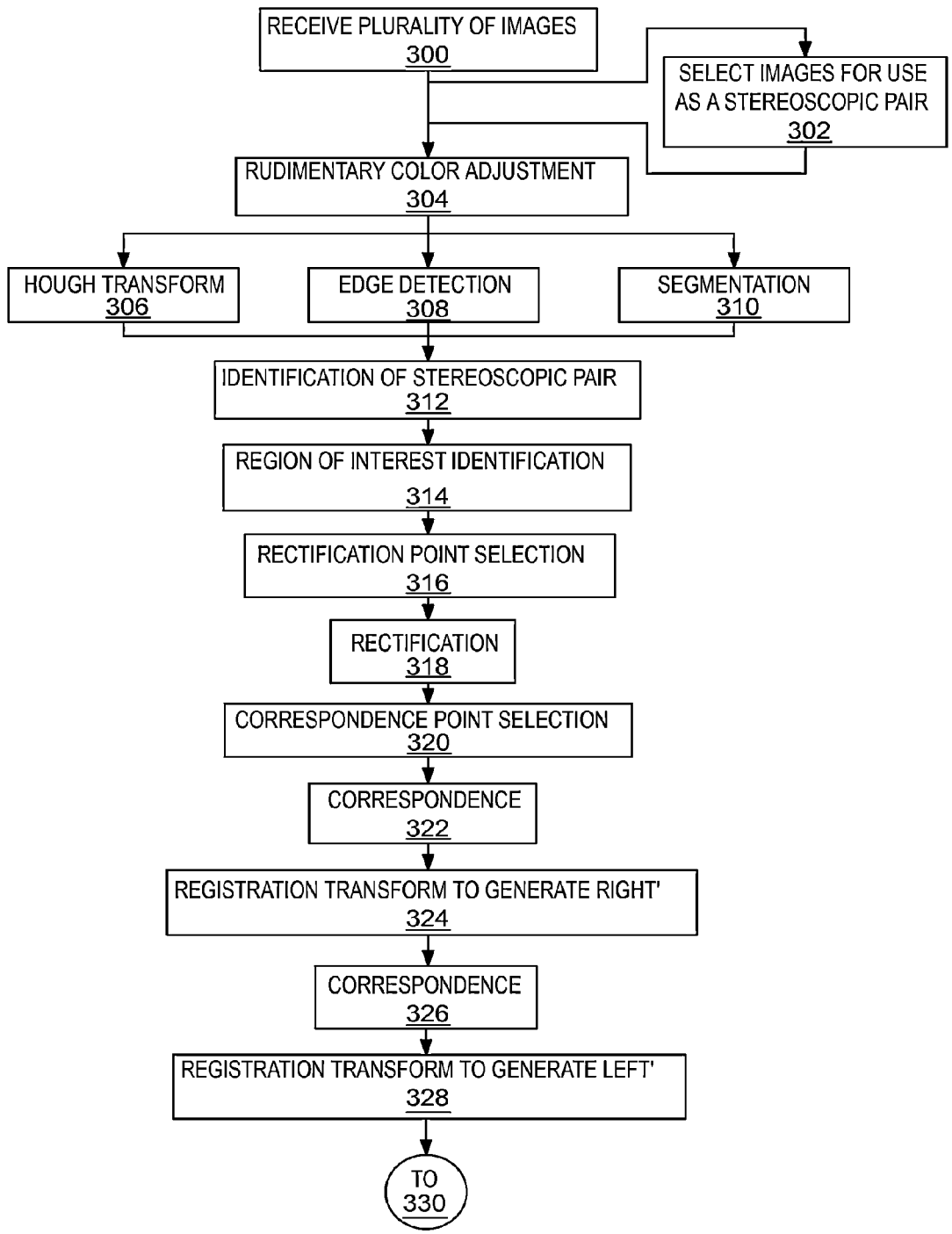
FIGS. 3A and 3B are a flow chart of an exemplary method for generating a three-dimensional image of a scene in accordance with embodiments of the present invention.
Figure 3B:
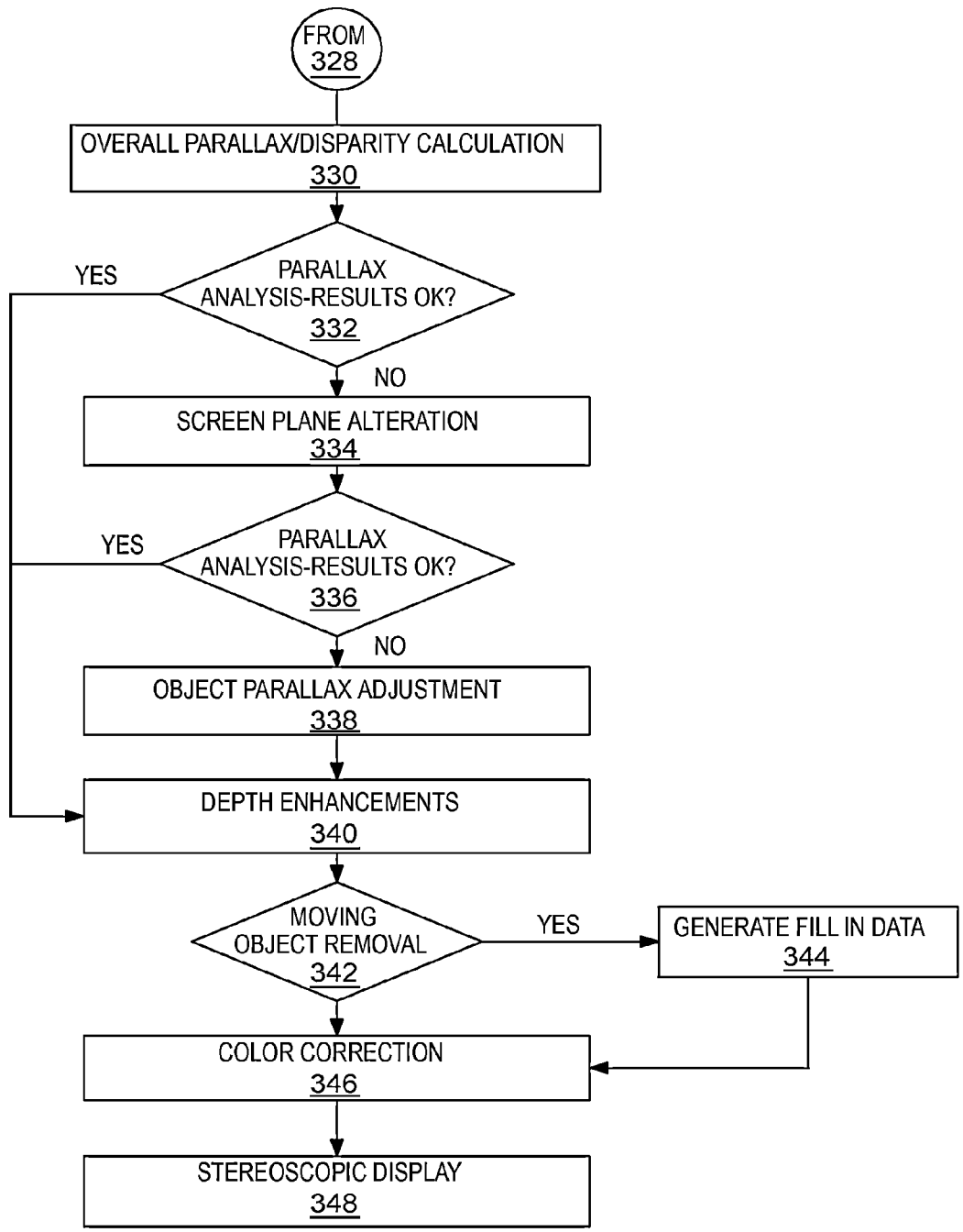

FIGS. 3A and 3B illustrate a flow chart of an exemplary method for generating a three-dimensional image of a scene in accordance with embodiments of the present invention. The method can convert a plurality of images to a three-dimensional image that can be viewed on a stereoscopic display. Referring to FIG. 3, the method can begin with receiving 300 a plurality of images of a scene. For example, the images can be captured by a standard digital video or still camera, or a plurality of different cameras of the same type or different types. A camera user may use the camera to capture an initial image. Next, the camera user may capture subsequent image(s) at positions to the left or right of the position at which the initial image was captured. These images may be captured as still images or as a video sequence of images. The images may be captured using a device such as the device 100 shown in FIG. 1. The images may be stored in a memory such as the memory 104 shown in FIG. 1. In another example, the images may be received at a device after they have been captured by a different device.

Figure 4A:
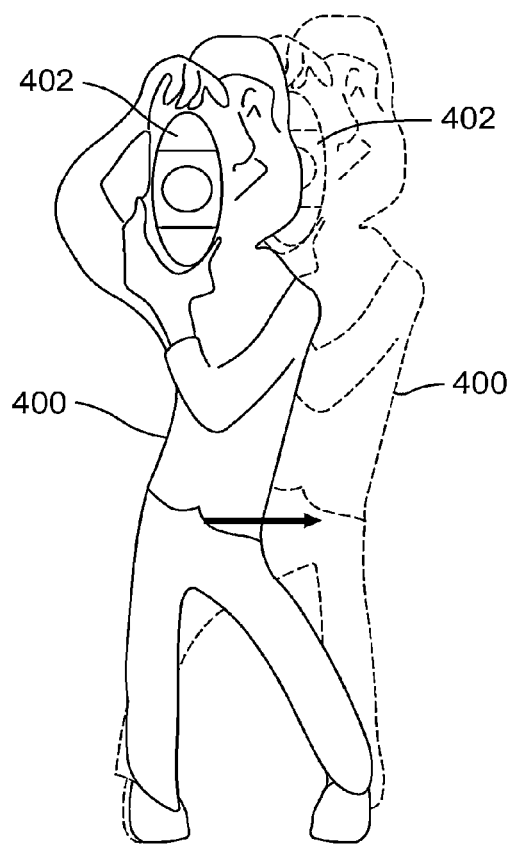
FIG. 4A is a front view of a user moving between positions for capturing different images using a camera in accordance with embodiments of the present invention.

Image pairs suitable for use as a three-dimensional image may be captured by a user using any suitable technique. For example, FIG. 4A illustrates a front view of a user 400 moving between positions for capturing different images using a camera 402 in accordance with embodiments of the present invention. Referring to FIG. 4A, the user 400 is shown in solid lines in one position for capturing an image using the camera 402. The user 400 is shown in broken lines in another position for capturing another image using the camera 402. The camera 402 is also at different positions for capturing images offering different perspective views of a scene. In this example, the user 400 stands with his or her feet separated by a desired binocular distance, then captures the first image while aligning the camera over his or her right foot (the position of the user 400 shown in solid lines). Then the user captures the second image, and optionally other images in between, while aligning the camera 402 over his or her left foot (the position of the user 400 shown in broken lines). The captured images may be used for generating a three-dimensional image in accordance with embodiments of the present invention.

Figure 4B:
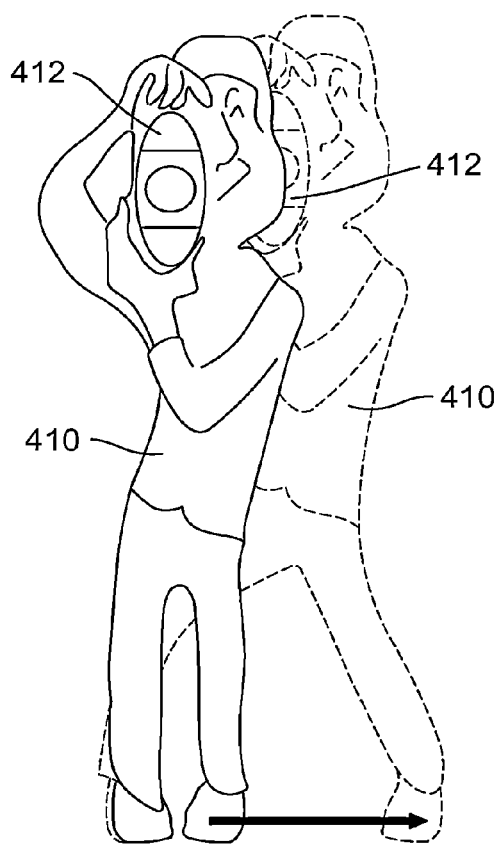
FIG. 4B is a front view of a user moving between positions for capturing images using a camera in accordance with embodiments of the present invention.

In another example, FIG. 4B illustrates a front view of a user 410 moving between positions for capturing different images of a scene using a camera 412 in accordance with embodiments of the present invention. Referring to FIG. 4B, the user 410 stands with his or her feet together and uses the camera 412 to capture the first image while maintaining a centered pose (the position of the user 410 shown in solid lines). Then the user moves one of his or her feet away from the other by twice the desired binocular distance while maintaining a centered pose and uses the camera 412 to capture the second image, and optionally other images in between (the position of the user 410 shown in broken lines). The captured images may be used for generating a three-dimensional image in accordance with embodiments of the present invention.

In accordance with embodiments of the present invention, a user may create high-quality, three-dimensional content using a standard digital still, video camera (or cameras), other digital camera equipment or devices (e.g., a camera-equipped mobile phone), or the like. In order to generate a good three-dimensional picture or image, a plurality of images of the same object can be captured from varied positions. In an example, in order to generate three-dimensional images, a standard digital still or video camera (or cameras) can be used to capture a plurality of pictures with the following guidelines. The user uses the camera to capture an image, and then captures subsequent pictures after moving the camera left or right from its original location. These pictures may be captured as still images or as a video sequence.

Figure 5:
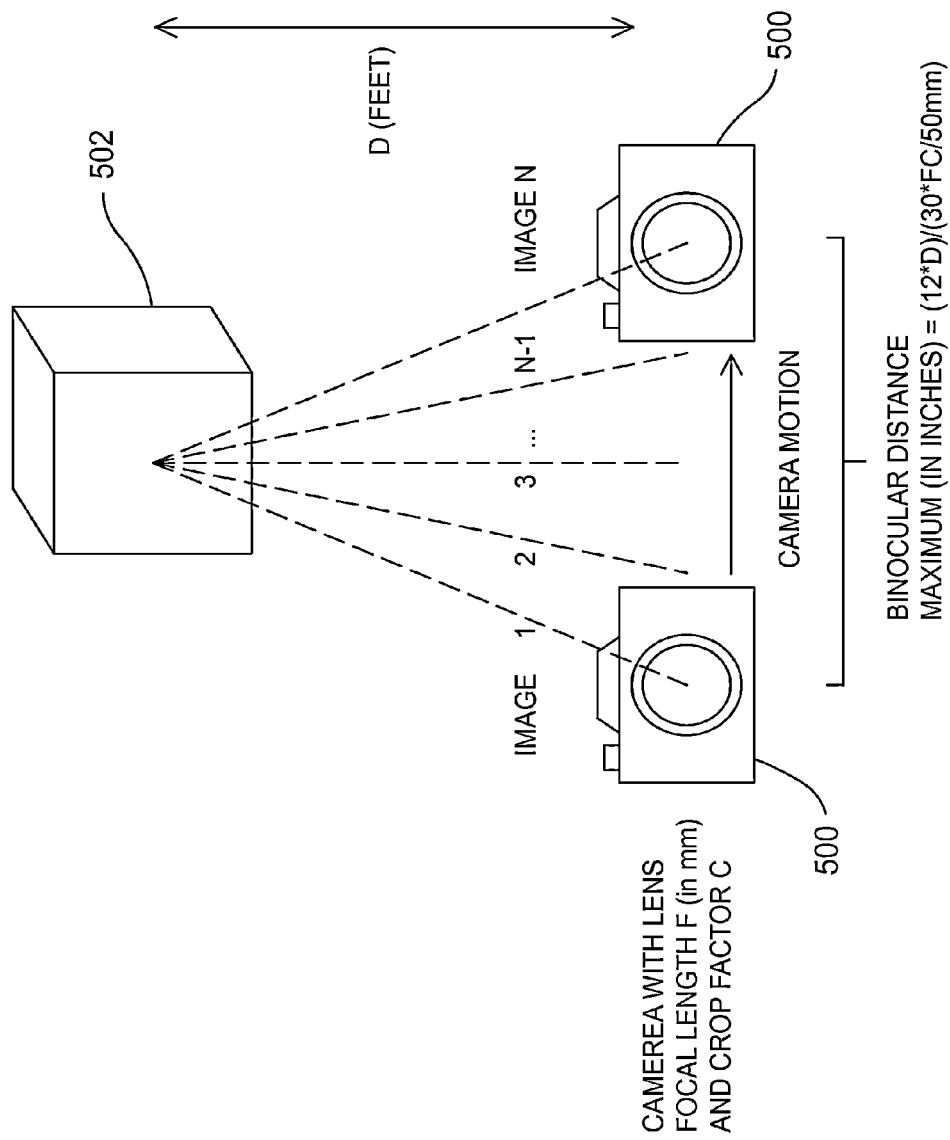
FIG. 5 illustrates an exemplary image capture method which facilitates later conversion to stereoscopic images in accordance with embodiments of the present invention.

FIG. 5 illustrates a diagram of an exemplary image capture technique for facilitating subsequent conversion to three-dimensional images in accordance with embodiments of the present invention. Referring to FIG. 5, a camera 500 is used for capturing N images (i.e., images 1, 2, 3, ... N−1, N) of an object of interest 502 within a scene. The camera 500 and the object 502 are positioned approximately D feet apart as each image is captured. The distance between positions at which images are captured (the stereo baseline)

for generating a three-dimensional image can affect the quality of the three-dimensional image. The optimal stereo baseline between the camera positions can vary anywhere between 3 centimeters (cm) and several feet, dependent upon a variety of factors, including the distance of the closest objects in frame, the lens focal length or other optics properties of the camera, the camera crop factor (dependent on sensor size), the size and resolution of the display on which the images will be viewed, and the distance from the display at which viewers will view the images. A general recommendation is that the stereo baseline should not exceed the distance defined by the following equation:

$$B = \frac{12D}{30FC/50},$$

where B is the stereo baseline separation in inches, D is the distance in feet to the nearest object in frame, F is the focal length of the lens in millimeters (mm), and C is the camera crop factor relative to a full frame (36×24 square mm) digital sensor (which approximates the capture of a 35 mm analog camera). In the examples provided herein, it is assumed that at least two images have been captured, at least two of which can be interpreted as a stereoscopic pair.

Returning to FIGS. 3A and 3B, the method may include selecting 302 images among the plurality of captured images for use as a stereoscopic pair. The identification of stereo pairs in step 302 is bypassed in the cases where the user has manually selected the image pair for 3D image registration. This bypass can also be triggered if a 3D-enabled capture device is used that identifies the paired images prior to the registration process. For example, the image generator function 114 shown in FIG. 1 may be used for selecting captured images for use as a stereoscopic pair. One or more metrics can be defined for measuring one or more attributes of the plurality of images for selecting a stereoscopic pair. For example, a buffer of M consecutive images may be maintained, or stored in the memory 104. The attributes of image with index m are compared with the corresponding attributes of image m+1. If there is no match between those two images, image m+1 is compared with image m+2. If images are determined to be sufficiently matched so as to be stereoscopic, and after those images have been processed as described below to generate a three-dimensional image, the m and m+2 images are compared to also identify a possible stereoscopic pair. The process may continue for all or a portion of the images in the buffer.

After images are determined to be a potential stereoscopic pair, the method includes applying 304 rudimentary color adjustment to the images. For example, the image generator function 114 shown in FIG. 1 may apply color adjustment to the images. This optional color adjustment can be a normalized adjustment or DC-correction applied to a single image to allow luminance-based techniques to work better. In addition, several additional criteria may typically be applied to the luminance planes (or optionally to all color planes), including, but not limited to, a Hough transform analysis 306, edge detection 308, segmentation 310, and the like. For example, segmented objects or blocks with high information content can be compared between the two image views using motion estimation techniques, based on differential error measures, such as, but not limited to, sum of absolute difference (SAD) or sum of squared errors (SSE), or correlation based measures, such as phase correlation or cross correlation. Rotational changes between the two images may be considered and identified during this procedure. Segmented objects that are in one view only are indicative of occlusion, and having a significant number of occluded regions is indicative of a poor image pair for stereoscopy. Regions of occlusion identified during this process are recorded for use in later parts of the conversion process. Similarly, motion vector displacement between matching objects may be recorded or stored for further use.

Using the results of the motion estimation process used for object similarity evaluation, vertical displacement can be assessed. Vertical motion vector components are indicative of vertical parallax between the images, which when large can indicate a poor image pair. Vertical parallax must be corrected via rectification and registration to allow for comfortable viewing, and this correction will reduce the size of the overlapping region of the image in proportion to the original amount of vertical parallax.

Using the motion vectors from the similarity of objects check, color data may be compared to search for large changes between images. Such large changes can represent a color difference between the images regardless of similar luminance.

A Hough transform can be applied (e.g., step 306 of FIGS. 3A and 3B) to identify lines in the two images of the potential stereoscopic pair. Lines that are non-horizontal, non-vertical, and hence indicate some perspective in the image can be compared between the two images to search for perspective changes between the two views that may indicate a perspective change or excessive toe-in during capture of the pair.

The aforementioned criteria may be applied to scaled versions of the original images for reducing computational requirements. The results of each measurement may be gathered, weighted, and combined to make a final decision regarding the probable quality of a given image pair as a stereoscopic image pair.

The method of FIGS. 3A and 3B includes identifying 312 a valid stereoscopic pair. This step may be implemented, for example, by the image generator function 114 shown in FIG. 1.

The method of FIGS. 3A and 3B can also include determining which image of the stereoscopic pair represents the left view image and which image represents the right view image. This aspect can be important in many applications since, for example, a user can capture a plurality of images moving to the left or right. First, image segmentation 308 can be performed to identify objects within the two captured views. The motion estimation step that has been defined before saves the motion vectors of each object or block with high information content. If the general motion of segmented objects is to the right for one view relative to the other, it is indicative of a left view image, and vice versa. Since the process of motion estimation of segmented objects is also used in stereoscopic pair evaluation, left/right image determination can be performed in parallel.

For a stereo pair of left and right view images, the method of FIGS. 3A and 3B includes region of interest identification 314, rectification point selection 316, and rectification 318. For example, interest points for stereo correspondence, rectification and registration can be identified. According to embodiments of the present invention, the left view image, sized N×M, is broken into a number, N, of smaller n×m sub-images. Each sub-image can be filtered to find junction points, or interest points, within and between objects in view. Interest points can be identified, for example, by performing horizontal and vertical edge detection, filtering for strong edges of a minimum length, and identifying crossing points of these edges. Interest point determination can be assisted by Hough transform line analysis when determining the dominant edges in a scene. Interest points may not be selected from areas identified as occluded in the initial analysis of a stereo pair. Interest points can span the full image.

For a stereo pair of left and right view images with a set of identified interest points, rectification 318 may be performed on the stereo pair of images. Using the interest point set for the left view image, motion estimation techniques (as described in stereo pair identification above) and edge matching techniques are applied to find the corresponding points in the right view image. In an example, N corresponding points in left and right view images may be made into a 3×N set of point values, for example:

$$\text{right}_{pts} = \begin{Bmatrix} x1_r & x2_r & x3_r & \\ y1_r & y2_r & y3_r & \ldots \\ 1 & 1 & 1 & \end{Bmatrix}$$

and $$\text{left}_{pts} = \begin{Bmatrix} x1_l & x2_l & x3_l & \\ y1_l & y2_l & y3_l & \ldots \\ 1 & 1 & 1 & \end{Bmatrix},$$

and the fundamental matrix equation $$\text{right}_{pts}{}^T * F * \text{left}_{pts} = 0$$

is solved or approximated to determine the 3×3 fundamental matrix, F, and epipoles, e1 and e2. The camera epipoles are used with the interest point set to generate a pair of rectifying homographies. It can be assumed that the camera properties are consistent between the two captured images. The respective homographies are then applied to the right and left images, creating the rectified images. The overlapping rectangular region of the two rectified images is then identified, the images are cropped to this rectangle, and the images are resized to their original dimensions, creating the rectified image pair, right_r and left_r. The rectified image pair can be defined by the following equations:

right_r=cropped(F*right)

left_r=cropped(F*left)

For the stereo pair of "left_r" and "right_r" images, registration is next performed on the stereo pair. A set of interest points is required, and the interest point set selected for rectification (or a subset thereof) may be translated to positions relative to the output of the rectification process by applying the homography of the rectification step to the points. Optionally, a second set of interest points may be identified for the left_r image, and motion estimation and edge matching techniques may be applied to find the corresponding points in the right_r image. The interest point selection process for the registration operation is the same as that for rectification. Again, the N corresponding interest points are made into a 3×N set of point values as set forth in the following equations:

$$\text{right\_r}_{pts} = \begin{Bmatrix} x'1_r & x'2_r & x'3_r & \\ y'1_r & y'2_r & y'3_r & \ldots \\ 1 & 1 & 1 & \end{Bmatrix}$$

and $$\text{left\_r}_{pts} = \begin{Bmatrix} x'1_l & x'2_l & x'3_l & \\ y'1_l & y'2_l & y'3_l & \ldots \\ 1 & 1 & 1 & \end{Bmatrix},$$

and the following matrix equation left_r$_{pts}$=Tr*right_r$_{pts}$ is approximated for a 3×3 linear conformal transformation, Tr, which may incorporate both translation on the X and Y axes and rotation in the X/Y plane. The transform Tr is applied to the right_r image to create the image "Right'" as defined by the following equation:

Right'=Tr*right_r, where right_r is organized as a 3×N set of points (xi$_r$, yi$_r$, 1) for i=1 to image_rows*image cols.

Finally, the second set of interest points for the left_r image may be used to find correspondence in the Right' image, the set of points as set forth in the following equations:

$$\text{Right'}_{pts} = \begin{Bmatrix} x'1_r & x'2_r & x'3_r & \\ y'1_r & y'2_r & y'3_r & \ldots \\ 1 & 1 & 1 & \end{Bmatrix} \text{ and}$$

$$\text{left\_r}_{pts} = \begin{Bmatrix} x'1_l & x'2_l & x'3_l & \\ y'1_l & y'2_l & y'3_l & \ldots \\ 1 & 1 & 1 & \end{Bmatrix},$$

is identified and composed, and the equation

Right'$_{pts}$=Tl*left_r$_{pts}$ is approximated for a second linear conformal transformation, Tl. The transform Tl is applied to the left_r image to create the image "Left'", as defined by the following equation:

Left'=Tl*left_r

"Right'" and "Left'" images represent a rectified, registered stereoscopic pair.

The method of FIGS. 3A and 3B includes an overall parallax, or disparity, calculation 330. According to embodiments of the present invention, for a stereoscopic pair of registered "Left'" and "Right'" images, a pixel-by-pixel parallax, or disparity, map is created. This can be performed, for example, by using a hierarchical motion estimation operation between the Left' and Right' images, starting with blocks sized N×N and refining as necessary to smaller block sizes. During the estimation process, only horizontal displacement may be considered, limiting the search range. After each iteration of the process, the best match position is considered for pixel-by-pixel differences, and the next refinement step, if needed, is assigned by noting the size of the individual pixel differences that are greater than a threshold, Tp. Regions of the image previously identified as occluded in one image are assigned the average parallax value of the pixels in the surrounding neighborhood. Regions of an image that are not known to be occluded from previous steps in the process, and for which an appropriate motion match cannot be found (pixel differences are never <Tp) are assigned to the maximum possible parallax value to allow for simple identification in later steps of the stereo composition process. In the example of FIGS. 3A and 3B, the method includes correspondence point selection 320, correspondence 322 and registration transform to generate the Right' image 324. In addition, the method includes correspondence 326 and a registration transform to generate the Left' image 328.

The method of FIGS. 3A and 3B also includes applying 332 a parallax analysis. For example, for a stereoscopic pair of registered "Left'" and "Right'" images, the maximum and minimum pixel parallax values can be analyzed to decide whether the maximum or minimum parallax is within the ability of a viewer to resolve a three-dimensional image. If it is determined that the parallax is within the ability of a viewer to resolve the three-dimensional image, the method proceeds to step 340. If not, the method proceeds to step 334. Occluded regions and pixels with "infinite" parallax are not considered in this exemplary method.

For a stereoscopic pair of registered "Left'" and "Right'" images, the screen plane of the stereoscopic image can be altered 334, or relocated, to account for disparities measured as greater than a viewer can resolve. This is performed by scaling the translational portion of transforms that created the registered image views by a percent offset and re-applying the transforms to the original images. For example, if the initial left image transform is as follows:

$$Tl = \begin{Bmatrix} S*\cos\theta & S*\sin\theta & Tx \\ -S*\sin\theta & S*\cos\theta & Ty \\ 0 & 0 & 1 \end{Bmatrix}$$

for scaling factor S, X/Y rotation angle θ, and translational offsets Tx and Ty, the adjustment transform becomes $$Tl_{alt} = \begin{Bmatrix} S*\cos\theta & S*\sin\theta & Tx*Xscale \\ -S*\sin\theta & S*\cos\theta & Ty*Yscale \\ 0 & 0 & 1 \end{Bmatrix}$$

where Xscale and Yscale are determined by the desired pixel adjustment relative to the initial transform adjustment, i.e., $$Xscale = 1 + \frac{(desired\_pixel\_adjustment)}{Tx}.$$

Only in rare occurrences will Yscale be other than zero, and only then as a corrective measure for any noted vertical parallax. Using the altered transform, a new registered image view is created, e.g. the following:

Left'=$Tl_{alt}$*left_r

Such scaling effectively adds to or subtracts from the parallax for each pixel, effectively moving the point of now parallax forward or backward in the scene. The appropriate scaling is determined by the translational portion of the transform and the required adjustment.

At step 336 of FIGS. 3A and 3B, it is determined whether the parallax is within the ability of a viewer to resolve the three-dimensional image. If it is determined that the parallax is within the ability of a viewer to resolve the three-dimensional image, the method proceeds to step 340. If not, the method proceeds to step 340. For a stereoscopic pair of registered "Left'" and "Right'" images, the pixel-by-pixel parallax for pixels of segmented objects may also be adjusted 338, or altered, which effectively performs a pseudo-decrease (or increase) in the parallax of individual segmented objects for objects that still cannot be resolved after the screen adjustments above. This process involves the same type of manipulation and re-application of a transform, but specific to a given region of the picture, corresponding to the objects in question.

Since moving an object region in the image may result in a final image that has undefined pixel values, a pixel-fill process is required to ensure that all areas of the resultant image have defined pixel values after object movement. An exemplary procedure for this is described below. Other processes, both more or less complex, may be applied.

The method of FIGS. 3A and 3B also includes performing 340 depth enhancements. For example, for a stereoscopic pair of registered "Left'" and "Right'" images, the screen plane of the stereoscopic image may be relocated to allow a viewer to emphasize or de-emphasize object depth in the three-dimensional image. This relocation may be implemented to enhance the subjective quality of the displayed image or to create three-dimensional effects that involve changing object depth over time to simulate motion. The process for this uses the same procedures as for general readjustment of the screen plane, and for segmented object specific adjustments, but is performed voluntarily for effect, rather than necessarily for correction.

The method of FIGS. 3A and 3B includes removing 342 moving objects. For example, for a stereoscopic pair of registered "Left'" and "Right'" images, disparity differences can be identified which indicate object motion within, into, or out of the image frame for one image. These areas can be identifiable as those which have "infinite" parallax assignments from the disparity map step of the process. Areas indicating such motion are replicated or removed using data from the other image view and/or other views captured between the "Left" and "Right" images. Without any loss of generality, it will be assumed that first picture taken is the leftmost, and the last picture taken is the rightmost. In actuality, the opposite can occur. In the following description the following definitions apply:
  First picture: the first picture captured in the sequence (1)
  Last picture: the last picture captured in the sequence (N)
  Leftmost pictures: any set of pictures from 1st to N−1
  Rightmost pictures: any set of pictures from 2nd to Nth
  Left target picture: any of the leftmost pictures or a modified version of all captured pictures that will be used during the 3D generation process as left picture
  Right target picture: any of the rightmost pictures or a modified picture that will be used during the 3D generation process as right picture The method of identifying and compensating for moving objects consists of the following steps. For a given sequence of pictures captured between two positions, divide each picture into smaller areas and calculate motion vectors between all pictures in all areas. Calculate by a windowed moving average the global motion that results from the panning of the camera. Then subtract the area motion vector from the global motion to identify the relative motion vectors of each area in each picture. If the motion of each area is below a certain threshold, the picture is static and the first and last picture, or any other set with the desired binocular distance, can be used as left and right target pictures to form a valid stereoscopic pair that will be used for registration, rectification, and generation of a 3D picture. If the motion of any area is above an empirical threshold, then identify all other areas that have zero motion vectors and copy those areas from any of the leftmost pictures to the target left picture and any of the rightmost pictures to the target right picture.

For objects where motion is indicated and where the motion of an object is below the acceptable disparity threshold, identify the most suitable image to copy the object from, copy the object to the left and right target images and adjust the disparities. The more frames that are captured, the less estimation is needed to determine the rightmost pixel of the right view. Most of occluded pixels can be extracted from the leftmost images. For an object that is moving in and out of the scene between the first and last picture, identify the object and completely remove it from the first picture if there is enough data in the captured sequence of images to fill in the missing pixels.

For objects where motion is indicated and where the motion is above the acceptable disparity, identify the most suitable picture from which to extract the target object and extrapolate the proper disparity information from the remaining captured pictures.

The actual object removal process involves identifying N×N blocks, with N empirically determined, to make up a bounding region for the region of "infinite" parallax, plus an additional P pixels (for blending purposes), determining the corresponding position of those blocks in the other images using the parallax values of the surrounding P pixels that have a similar gradient value (meaning that high gradient areas are extrapolated from similar edge areas and low gradient areas are extrapolated from similar surrounding flat areas), copying the blocks/pixels from the opposite locations to the intended new location, and performing a weighted averaging of the outer P "extra" pixels with the pixel data currently in those positions to blend the edges. If it is determined to remove an object, fill-in data is generated 344. Otherwise, the method proceeds to step 346.

At step 346, the method includes applying 346 color correction to the images. For example, for a plurality of images, a pixel-by-pixel color comparison may be performed to correct lighting changes between image captures. This is performed by using the parallax map to match pixels from Left' to Right' and comparing the luminance and chrominance values of those pixels. Pixels with both large luminance and chrominance discrepancies are ignored, assuming occlusion. Pixels with similar luminance and variable chrominance are altered to average their chrominance levels to be the same. Pixels with similar chrominance and variable luminance are altered to average their luminance values to account for lighting and reflection changes.

For a finalized, color corrected, motion corrected stereoscopic image pair, the "Left'" and "Right'" images are ordered and rendered to a display as a stereoscopic image. The format is based on the display parameters. Rendering can require interlacing, anamorphic compression, pixel alternating, and the like.

For a finalized, color corrected, motion corrected stereoscopic image pair, the "Left'" view may be compressed as the base image and the "Right'" image may be compressed as the disparity difference from the "Left'" using a standard video codec, differential JPEG, or the like.

The method of FIGS. 3A and 3B includes displaying 348 the three-dimensional image on a stereoscopic display. For example, the three-dimensional image may be displayed on the display 112 of the device 100 or a display of the computer 108. Alternatively, the three-dimensional image may be suitably communicated to another device for display.

When a video sequence is captured with lateral camera motion as described above, stereoscopic pairs can be found within the sequence of resulting images. Stereoscopic pairs are identified based on their distance from one another determined by motion analysis (e.g., motion estimation techniques). Each pair represents a three-dimensional picture or image, which can be viewed on a suitable stereoscopic display. If the camera does not have a stereoscopic display, the video sequence can be analyzed and processed on any suitable display device. If the video sequence is suitable for conversion to three-dimensional content (e.g., one or more three-dimensional images), it is likely that there are many potential stereoscopic pairs, as an image captured at a given position may form a pair with images captured at several other positions. The image pairs can be used to create three-dimensional still images or re-sequenced to create a three-dimensional video.

Figure 6:
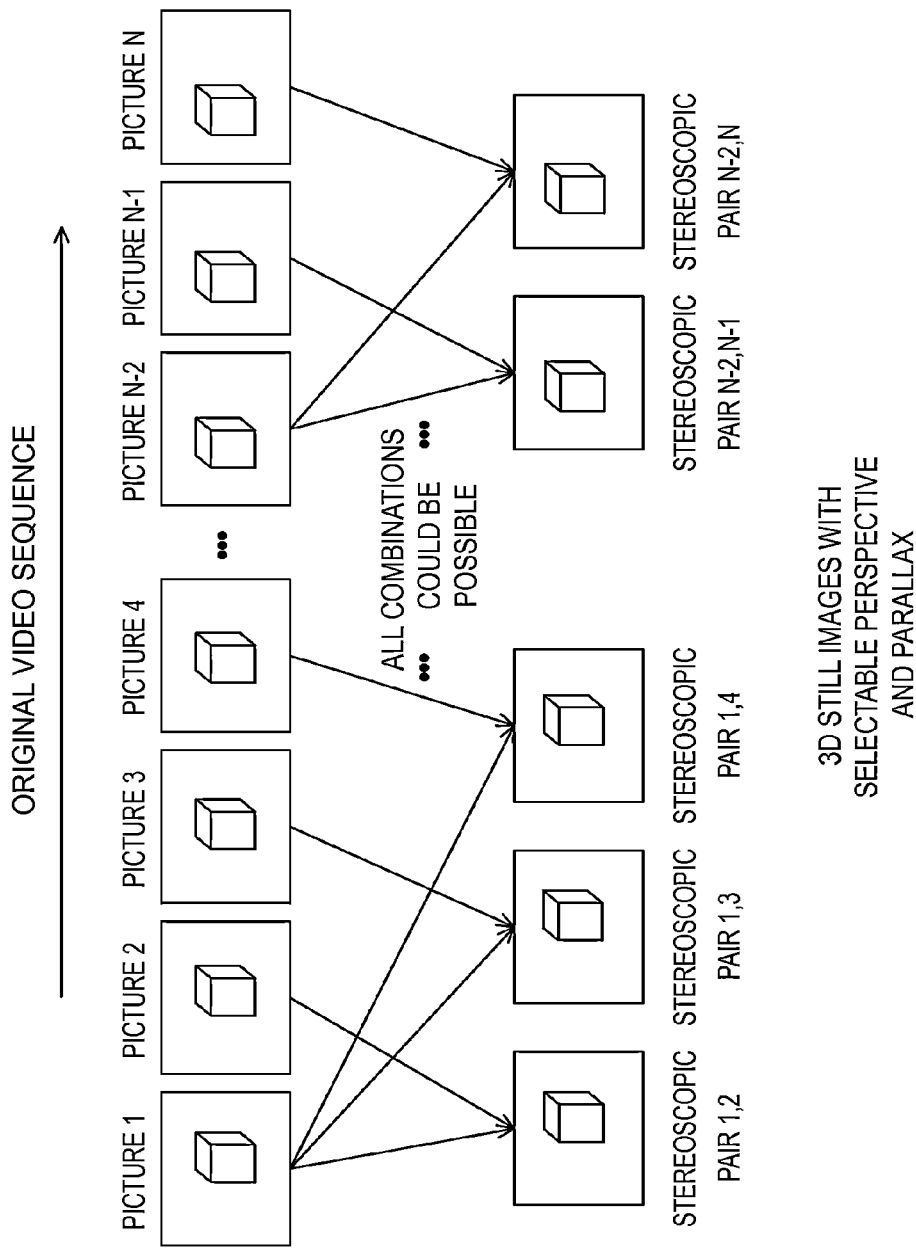
FIG. 6 illustrates an exemplary method for creating three-dimensional still images from a standard two-dimensional video sequence by identifying stereoscopic pairs in accordance with embodiments of the present invention.
Figure 7:
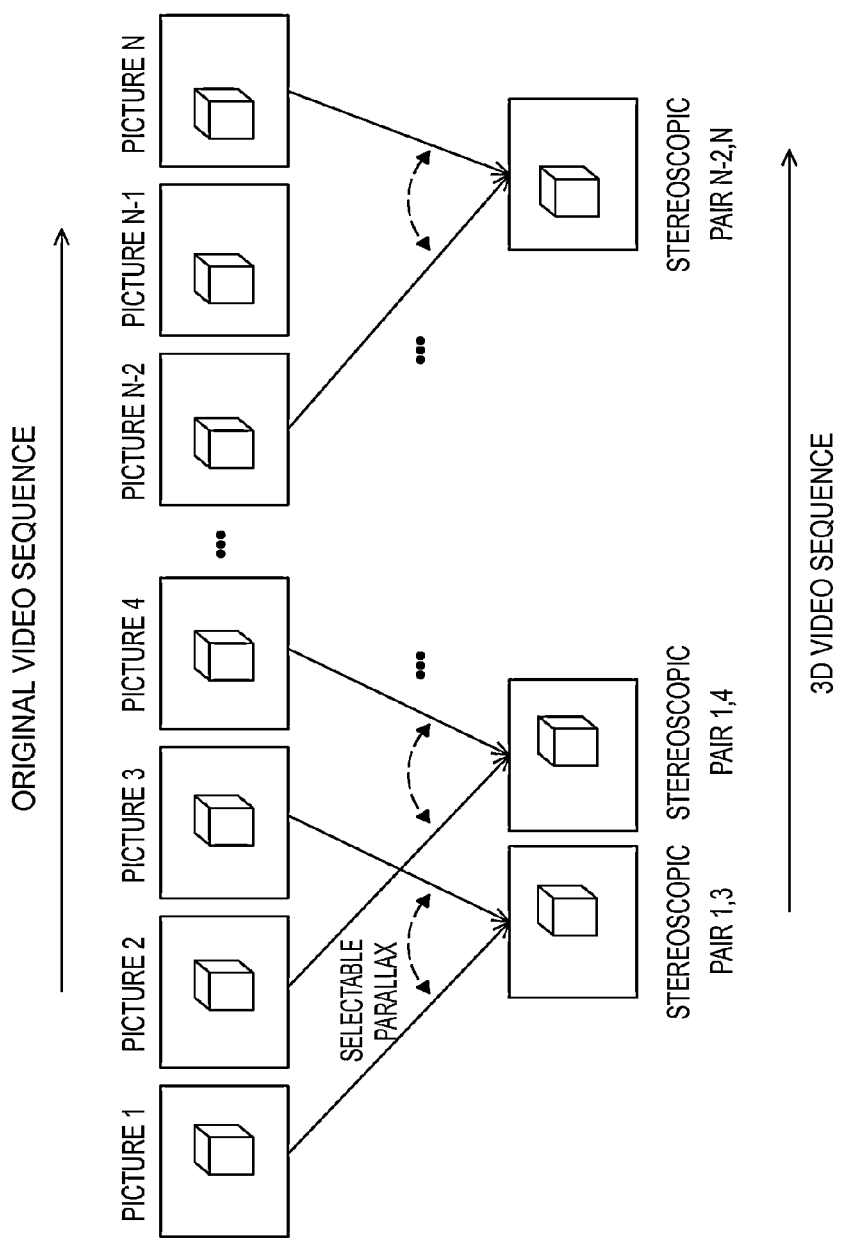
FIG. 7 illustrates an exemplary method for creating three-dimensional video from a standard two-dimensional video sequence according to embodiments of the present invention.

When generating three-dimensional still images, the user can select which images to use from the potential pairs, thereby adjusting both the perspective and parallax of the resulting images to achieve the desired orientation and depth. FIG. 6 illustrates an exemplary method for generating three-dimensional still images from a standard two-dimensional video sequence by identifying stereoscopic pairs in accordance with embodiments of the present invention. Referring to FIG. 6, this method can be used to generate content for multi-view stereoscopic displays by generating a set of three-dimensional images of a subject with the same parallax but captured from slightly different positions. A three-dimensional video sequence can be generated using one of the following methods. The first method is to select stereoscopic pairs with a constant positional offset, and sequence them in the same relative order in which they were captured. The user can select the offset to achieve the desired depth. During playback this method creates the effect of camera motion the same as occurred during capture, while the depth of the scene remains constant due to the fixed parallax. FIG. 7 illustrates an exemplary method for generating three-dimensional video from a standard two-dimensional video sequence according to embodiments of the present invention.

Figure 8:
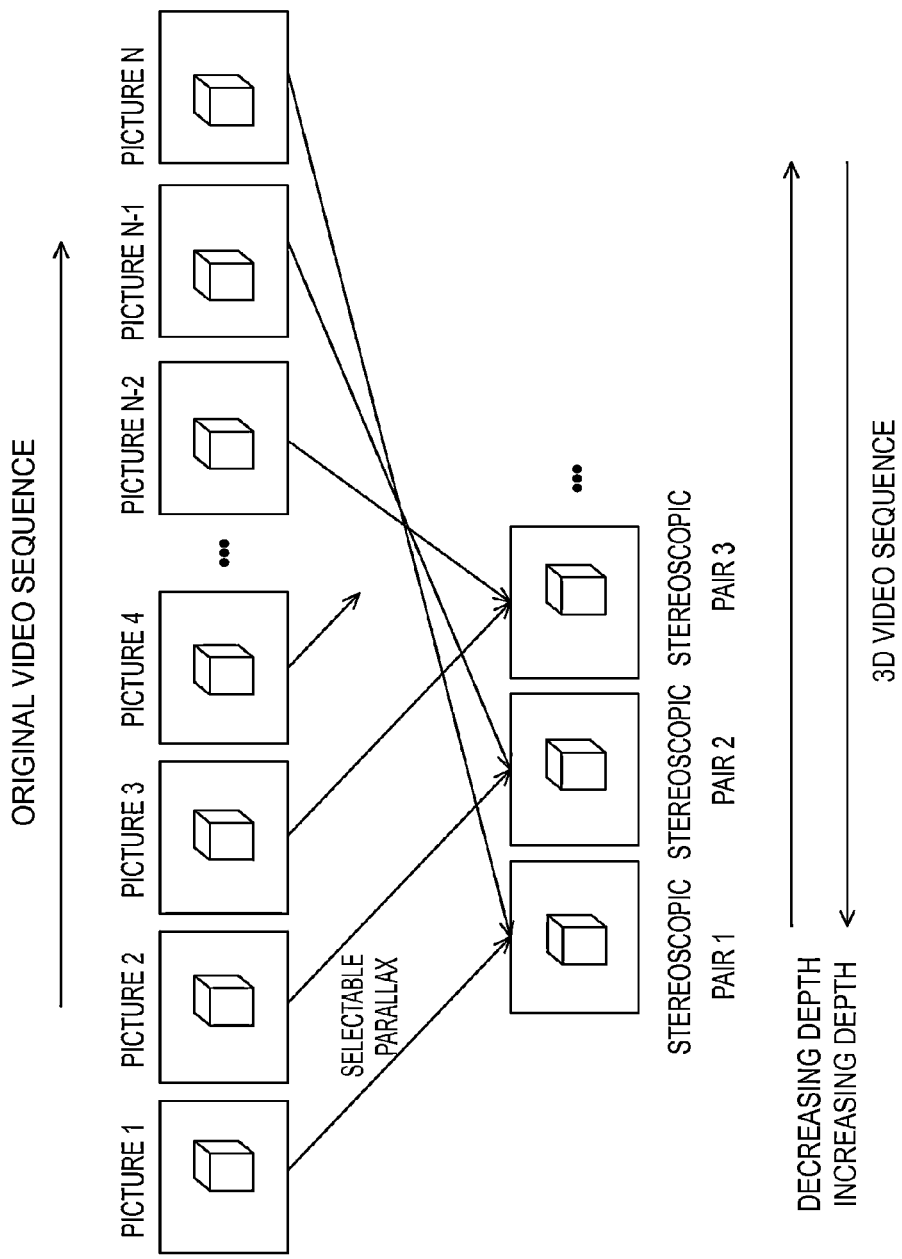
FIG. 8 illustrates an exemplary method of creating three-dimensional video with changing parallax and no translational motion from a standard two-dimensional video sequence in accordance with embodiments of the present invention.

Another method of generating a three-dimensional sequence includes generating stereoscopic pairs by grouping the first and last images in the sequence, followed by the second and next-to-last images, and so on until all images have been used. During playback this creates the effect of the camera remaining still while the depth of the scene decreases over time due to decreasing parallax. The three-dimensional images can also be sequenced in the opposite order so that the depth of the scene increases over time. FIG. 8 illustrates an exemplary method of generating three-dimensional video with changing parallax and no translational motion from a standard two-dimensional video sequence in accordance with embodiments of the present invention. The camera or other display device can store a representation of the resulting three-dimensional still images or video in a suitable compressed format as understood by those of skill in the art. For more efficient storage of still images, one of the images in the stereoscopic pair can be compressed directly, while the other image can be represented by its differences with the first image. For video sequences, the first stereoscopic pair in the sequence can be stored as described above for still images, while all images in other pairs can be represented by their differences with the first image.

In the case of still cameras, camera phones, and the like, the present invention facilitates suitable image capture by allowing the detection of critical patterns in the first image and superposing those patterns when capturing subsequent images. Following this method, a pair of images is available that can be manipulated as necessary to render on a three-dimensional-capable display. This might include side-by-side rendering for auto-stereoscopic or polarized displays, interlaced line rendering for polarized displays, or two dimension plus delta rendering for anaglyph displays.

Figure 9:
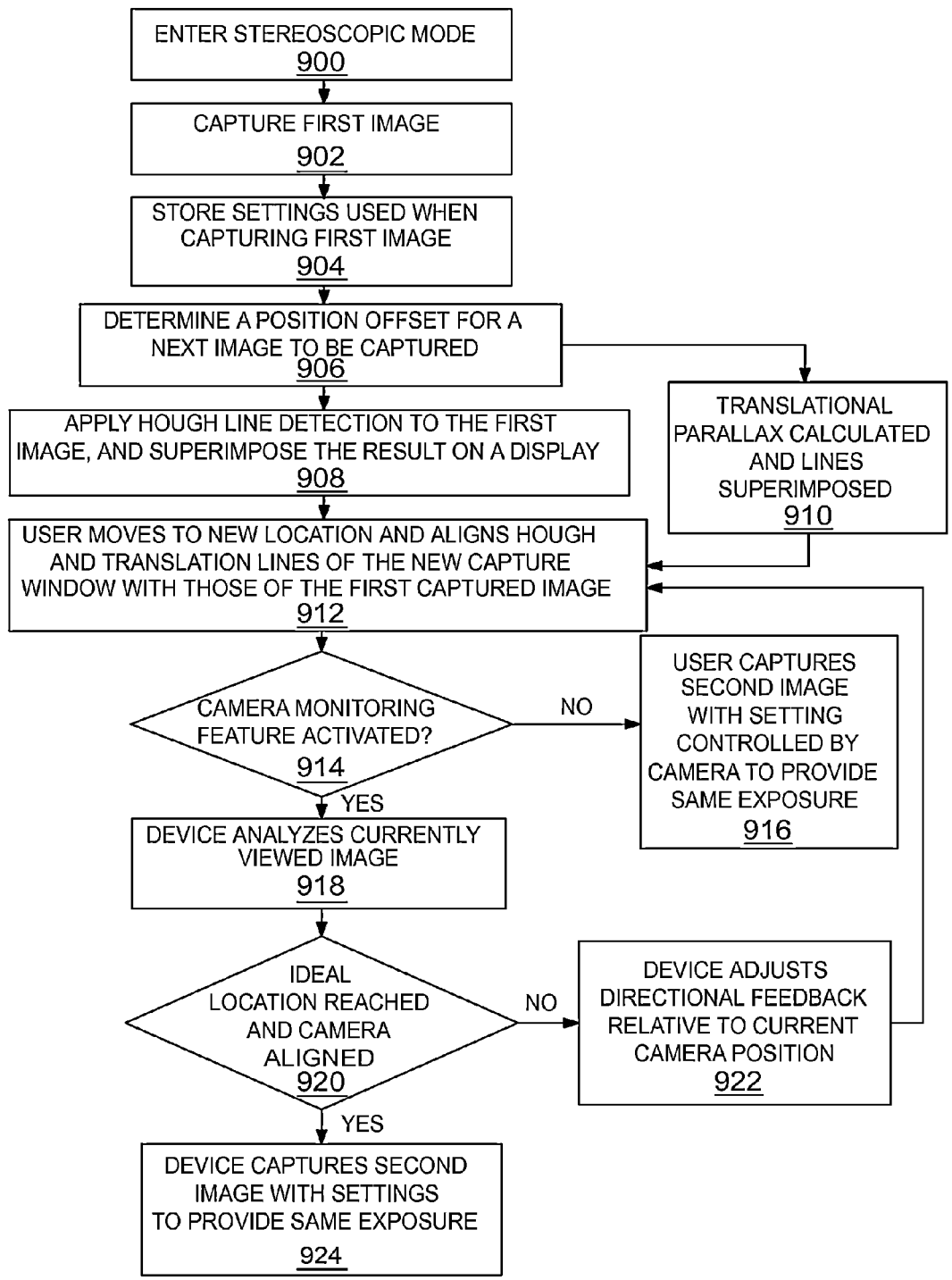
FIG. 9 illustrates an exemplary camera-assisted image capture procedure in accordance with embodiments of the present invention.

Embodiments of the present invention define a "stereoscopic mode," which may be used in conjunction with a standard digital still camera, standard video camera, other digital camera, or the like to assist the camera user in performing the function of capturing images that ultimately yield high-quality, three-dimensional images. FIG. 9 illustrates a flow chart of an exemplary method for assisting a user to capture images for use in a process to yield high-quality, three-dimensional images in accordance with embodiments of the present invention. The image generator function 114 shown in FIG. 1 may be used for implementing the steps of the method of FIG. 9. Referring to FIG. 9, the method includes entering 900 a stereoscopic mode. After entering the stereoscopic mode, the method includes capturing 902 the first image of the object or scene of interest. The camera stores 904 its settings, including, but not limited to, aperture, focus point, focus algorithm, focal length, ISO, exposure, and the like, for use in capturing other images of the object or scene, to ensure consistent image quality. According to an aspect, the only camera variable that may be allowed to change between image captures of a pair is shutter speed, and then, only in the context of maintaining a constant exposure (to suitable tolerances).

The method of FIG. 9 includes determining 906 a position offset for a next image to be captured. For example, in the stereoscopic mode, upon capture of the first image of a pair, the camera may use the information relating to optics, focus, and depth of field (Circle of Confusion), in combination with measurable qualities of the capture image, to approximate the depth of the closest focused object in the frame. For a given combination of image (camera) format circle of confusion (c), f-stop (aperture) (A), and focal length (F), the hyperfocal distance (the nearest distance at which the far end depth of field extends to infinity) of the combination can be approximated using the following equation:

$$H \approx \frac{F^2}{A*c}.$$

In turn, the near field depth of field ($D_n$) for an image can be approximated for a given focus distance (d) using the following equation:

$$D_n \approx \frac{H*d}{(H+d)}$$

(for moderate to large d), and the far field DOF ($D_f$) as $$D_f \approx \frac{H*d}{(H-d)}$$

for d<H. For values of d>=H, the far field DOF is infinite.

Since the focus distance, focal length, and aperture are recorded at the time of capture, and the circle of confusion value is known for a given camera sensor format, the closest focused object can be assumed to be at the distance $D_n$, while the furthest focused pixels are at $D_f$.

In addition to this depth calculation, edge and feature point extraction may be performed on the image to identify interest points for later use. To reduce the complexity of this evaluation, the image may be down-scaled to a reduced resolution before subsequent processing. An edge detection operation is performed on the resultant image, and a threshold operation is applied to identify the most highly defined edges at a given focus distance. Finally, edge crossing points are identified. This point set, IP, represents primary interest points at the focused depth(s) of the image.

Figure 10A:
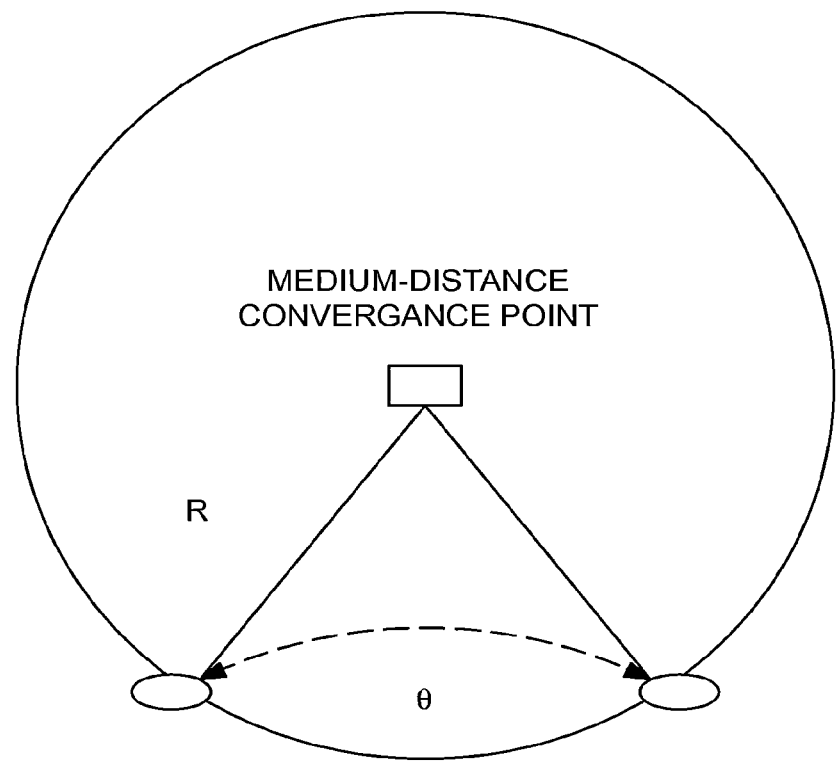
FIGS. 10A and 10B illustrate an example of close and medium-distance convergence points in accordance with embodiments of the present invention.
Figure 10B:
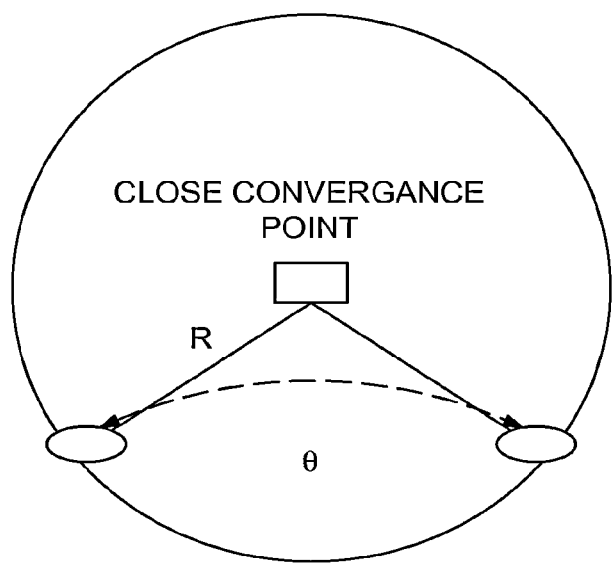

The stereoscopic camera assist method then uses the depth values $D_n$ and $D_f$ to determine the ideal distance to move right or left between the first and subsequent image captures. The distance to move right or left between the first and subsequent image captures is the position offset. It is assumed that the optimal screen plane is some percentage, P, behind the nearest sharp object in the depth of field, or at $$D_s=(D_n*(1+P/100)),$$

where P is a defined percentage that may be camera and/or lens dependent. At the central point of this plane, an assumed point of eye convergence, there will be zero parallax for two registered stereoscopic images. Objects in front of and behind the screen plane will have increasing amounts of disparity as the distance from the screen increases (negative parallax for objects in front of the screen, positive parallax for object behind the screen). FIGS. 10A and 10B depict diagrams of examples of close and medium-distance convergence points, respectively, in accordance with embodiments of the present invention. Referring to the examples of FIGS. 10A and 10B, this central point of the overlapping field of view on the screen plane (zero parallax depth) of the two eyes in stereoscopic viewing defines a circle that passes through each eye with a radius, R, equal to the distance to the convergence point. Still referring to FIGS. 10A and 10B, the angle, θ, between the vectors from the central point on the screen plane to each of the two eyes is typically between 1° and 6°. A default of 2° is applied, with a user option to increase or decrease the angle for effect. Medium distance convergence gives a relatively small angular change, while close convergence gives a relatively large angular change.

The value $D_s$ gives the value of R. Hence, the binocular distance indicated to the user to move before the second/last capture is estimated as $$B = 2*D_s \sin\frac{\theta}{2}.$$

Or for default θ=2°, and $$B = \frac{D_s}{29}$$

for B and $D_s$ measured in inches (or centimeters, or any consistent unit).

The method of FIG. 9 includes identifying a bounding box for the set of focused points, IP, defined above, and superimposing the boundaries of this region with proper translational offset, S, on a display (or viewfinder) as a guide for taking the second picture 910. In addition to the binocular distance calculation, a feedback mechanism may assist the user with camera alignment for the second/last capture 908.

One exemplary process for this is to apply a Hough transform for line detection to the first image, and superimpose the dominant horizontal and perspective lines in the two images (alternately colored) over the live-view mode or electronic viewfinder to assist the user in aligning the second/last picture vertically and for perspective. It should be noted that the Hough step is optional. For example, these guide lines may be displayed on the display 112 shown in FIG. 1. At step 912, a user moves the image capture device to a new location, aligning the translation region and any other guides on the display with those of the first captured image.

The value S is calculated using the value $D_s$ (converted to mm) and the angle of view (V) for the capture. The angle of view (V) is given by the equation $$V = 2 * \tan^{-1}\frac{W}{2*F}$$

for the width of the image sensor (W) and the focal length (F). Knowing V and $D_s$, the width of the field of view (WoV) can be calculated as $$WoV = 2*D_s*\tan(V/2) = D_s*W/F.$$

The width of view for the right eye capture is the same. Hence, if the right eye capture at the camera is to be offset by the binocular distance B, and the central point of convergence is modeled as B/2, the position of the central point of convergence in each of $WoV_1$ and $WoV_2$ (the width of view of images 1 and 2, respectively) can be calculated. Within $WoV_1$, the central point of convergence will lie at a position $$C1 = \frac{WoV}{2} + \frac{B}{2}.$$

Conversely, within $WoV_2$, the central point of convergence will lie at a position $$C2 = \frac{WoV}{2} - \frac{B}{2}.$$

Figure 13:
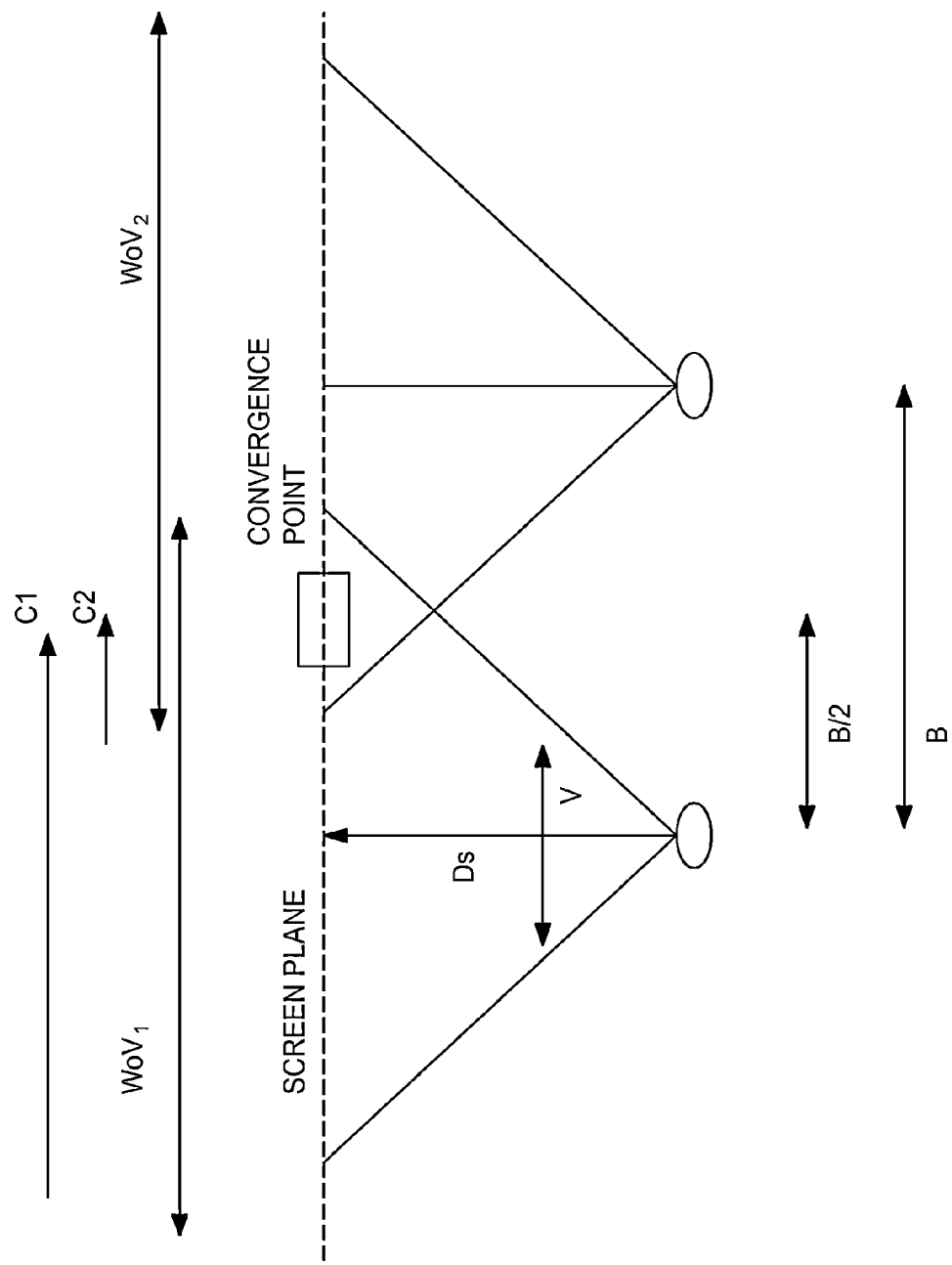
FIG. 13 is a schematic diagram illustrating translational offset determination according to embodiments of the present invention.

FIG. 13 is a schematic diagram illustrating translational offset determination according to embodiments of the present invention. If X1 is the X-coordinate in the left image that corresponds to C1, X1 is calculated as $$X1 = \frac{P_w}{WoV} * C1,$$

and X2 is the similar coordinate for the right image to be captured, calculated as $$X2 = \frac{P_w}{WoV} * C2,$$

where $P_w$ is the image width in pixels. Finally, S is calculated as $$S = X1 - X2 = \frac{P_w}{WoV} * B = \frac{2*P_w}{\frac{W}{F}} * \sin\frac{\theta}{2}.$$

Since W, F, and $P_w$ are camera-specific quantities, the only specified quantity is the modeled convergence angle, θ, as noted typically 1-2 degrees. The value S may need to be scaled for use with a given display, due to the potentially different resolution of the display and the camera sensor.

Figure 11:
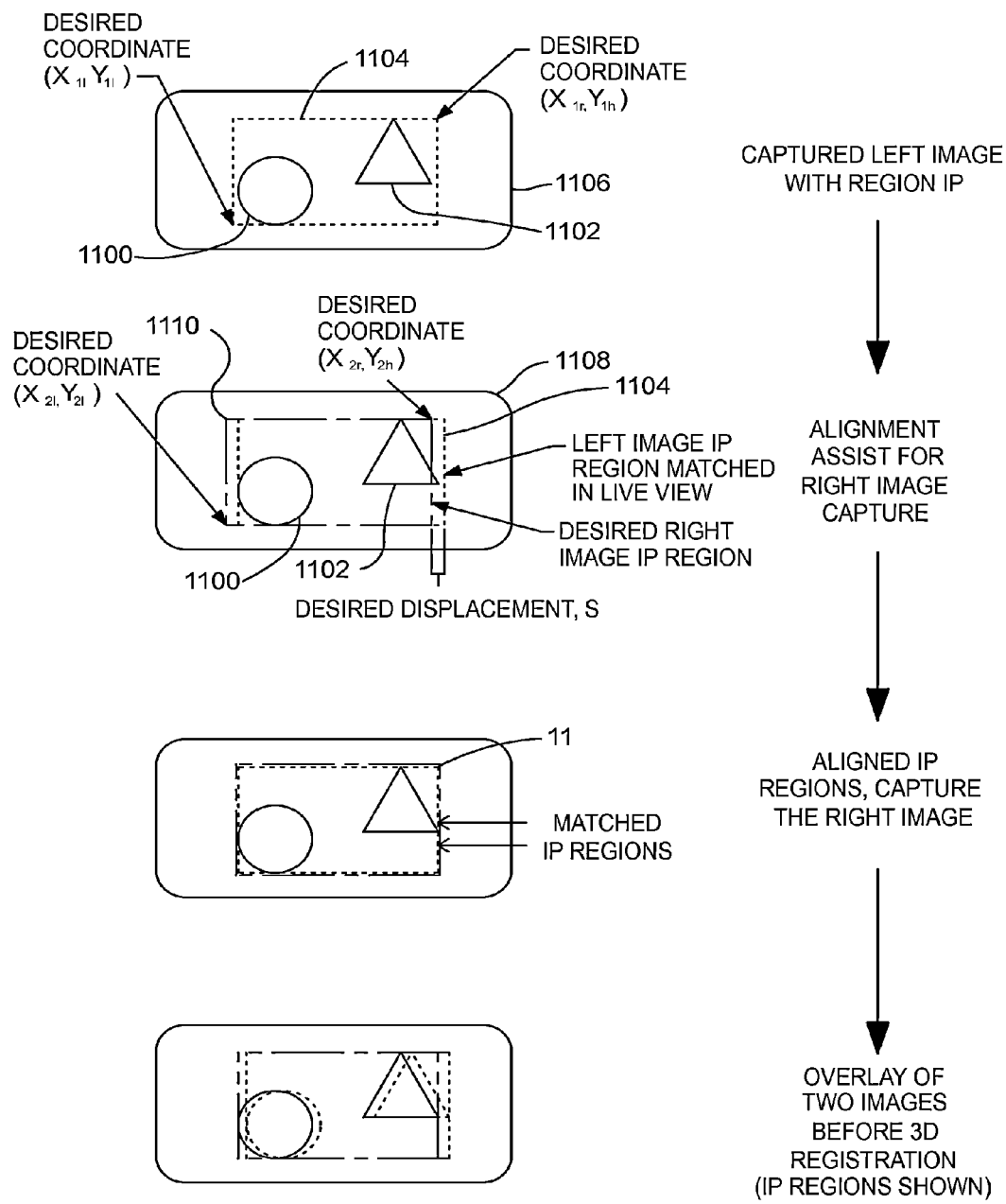
FIG. 11 illustrates an exemplary method of horizontal alignment assistance in accordance with embodiments of the present invention.

FIG. 11 illustrates an exemplary process of horizontal alignment assistance in accordance with embodiments of the present invention. For proper translation and vertical alignment, the guide region from this process should be aligned as precisely as possible. Referring to FIG. 11, objects 1100 and 1102 are within an interest point set (IP) (area of the image within the broken lines 1104) in a captured left image 1106. In the right image 1108 being shown in a live view on a camera display, the left image IP set 1104 is matched to the objects 1100 and 1102. Also, in the live view of the right image 1108, a desired right image IP set 1110 is displayed. The IP sets 1104 and 1110 serve as alignment guides. When the IP sets 1104 and 1110 are aligned exactly or sufficiently closely, the IP sets are suitably matched and the user knows that the subsequent image may be captured.

Figure 12:
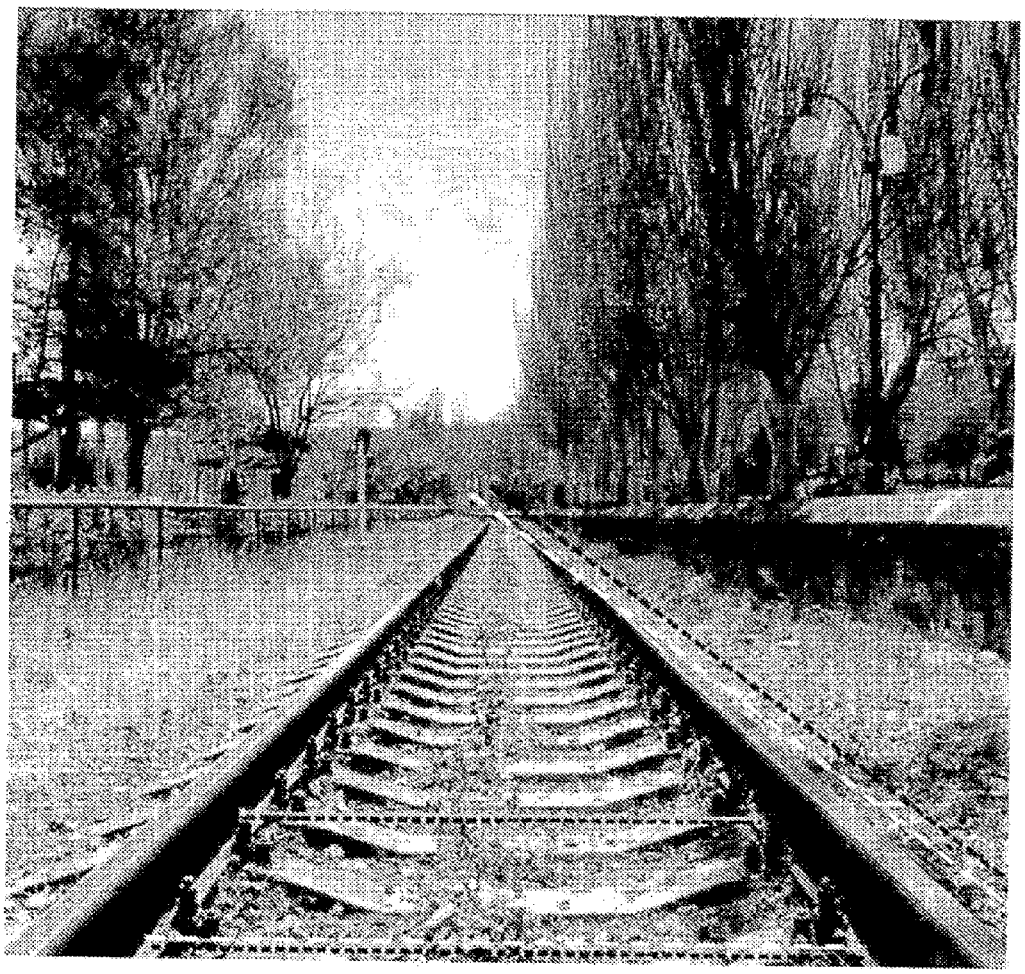
FIG. 12 illustrates an example of Hough transform lines, optionally superimposed for stereo capture assistance according to embodiments of the present invention.

In the case where guides beyond displacement and vertical alignment are generated (assisting with perspective alignment, rotation prevention, and the prevention of camera toe-in), FIG. 12 illustrates an example of Hough transform lines superimposed for stereo capture according to embodiments of the present invention. Three lines are superimposed on the live view or EVF window that are indicative of vertical alignment and perspective alignment, and three alternately colored lines are similarly superimposed at points on the live view or EVF window at the same distance, S, to the left (assuming left eye capture first) of where the IP region was captured in the first image. The guide region to be shown on the live view screen may be described by the following. Initially, the x-coordinate values of the left and right boundaries of the area defined by the interest point set of the captured left image (IP) are recorded as $X_{1l}$ and $X_{1r}$. The value S is calculated as described, and from this, the target offset coordinates for the right image capture are calculated as $X_{2l}$ and $X_{2r}$. Vertical lines may be superimposed at these coordinates in the live view screen as the "target lines," or another guide mechanism, such as a transparent overlay, may be used. The second guide that is superimposed is the "alignment guide," which represents the position of the left and right boundaries of the region of interest point set area as it is viewed in the live view window.

Figure 14A:
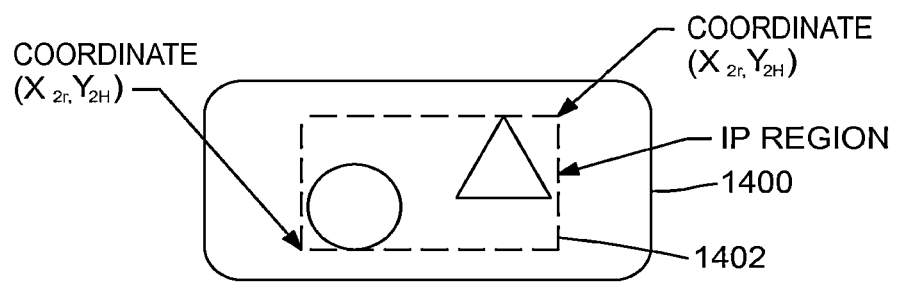
FIG. 14A illustrates an exemplary method of "alignment line" determination according to embodiments of the present invention.
Figure 14A:
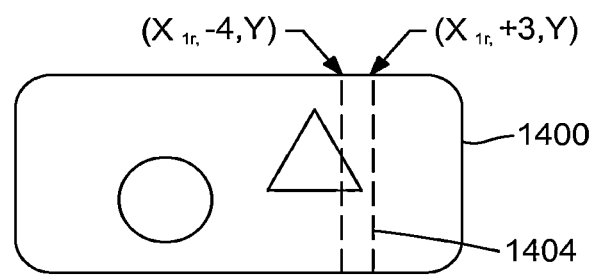
Figure 14A:
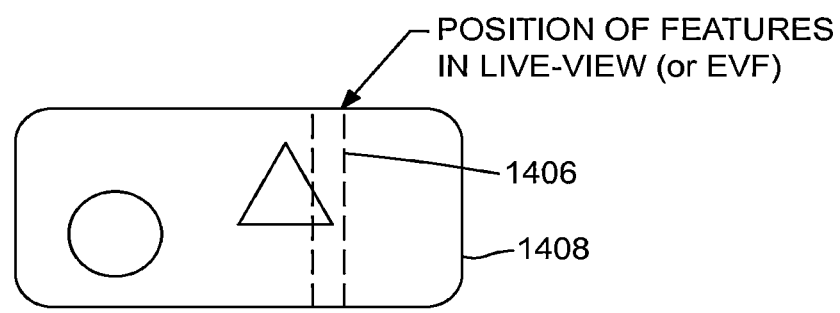
Figure 14A:
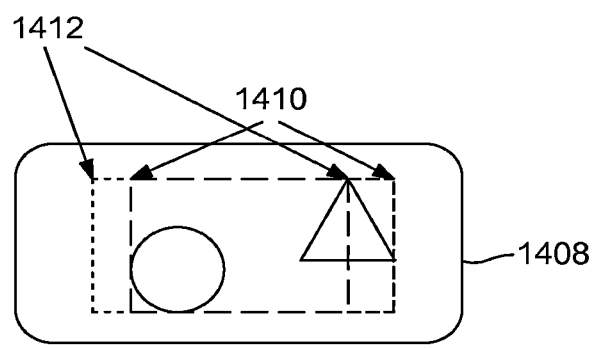

To determine the positions for the "alignment guide," block matching techniques using any common technique (sum of difference, cross correlation, etc.) can be used. In the left image capture, a vertical strip of 8×8 blocks is defined based on $x_{left}=X_{1r}-4$ and $x_{right}=X_{1r}+3$. Block matching can be performed versus the current live-view window image to determine the position of this same feature strip in the live-view window, and the right "alignment guide" can be drawn at the position of best match. The left "alignment guide" can then be drawn based on the known x-axis offset of $X_{1l}$ and $X_{1r}$ in the left image. FIG. 14A is an exemplary process of "alignment guide" determination according to embodiments of the present invention. Downsampling of the images may be performed to increase the speed of execution. Referring to FIG. 14A, image 1400 is a captured left image with an interest point region 1402. In the left image 1400, a strip of blocks 1404 for the right side of the interest point region 1402 may be identified. The strip of blocks 1404 in the left image 1400 may be matched to corresponding blocks 1406 in a live-view image 1408. Next, the process may include superimposing the "alignment guide" at the position of best match in the live view (or EVF) window 1410. The target guide 1412 may also be superimposed.

Figure 14B:
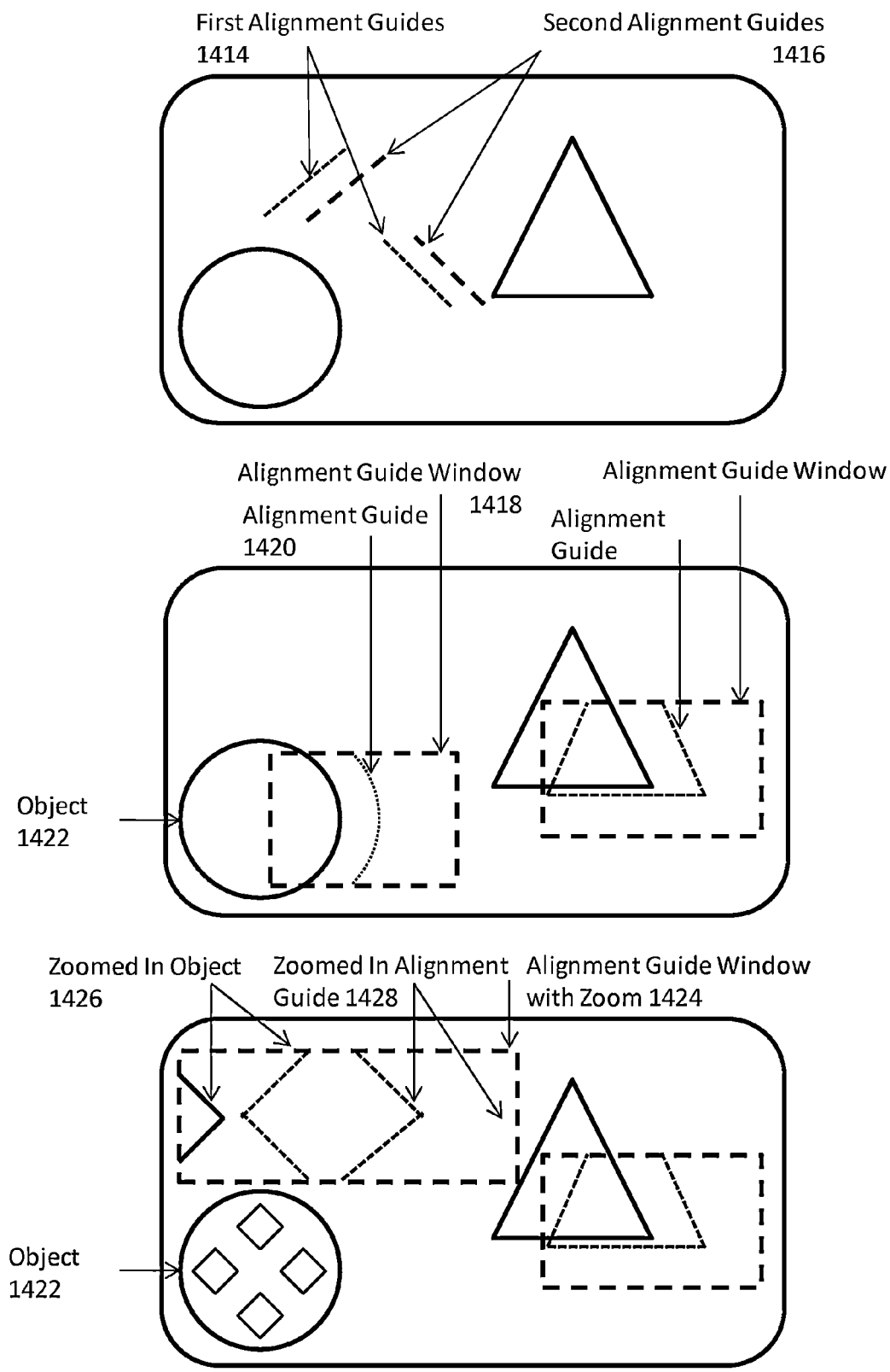
FIG. 14B is another exemplary process of "alignment guide" determination according to embodiments of the present invention.

FIG. 14B is another exemplary process of "alignment guide" determination according to embodiments of the present invention. Referring to 14B, a position and shape of a first alignment guide 1414 and a second alignment guide 1416 may be calculated by the device based on key points found within the scene being viewed. The guides 1414 and 1416 may or may not have an obvious relationship to objects within the scene. When the camera moves, the key points and alignment guides 1414 and 1416 associated with those points move accordingly. The device displays the alignment guides 1414 and 1416 at the desired location and the user then moves the camera so the first (live-view) alignment guides 1414 align with the second (target) alignment guides 1416.

In accordance with other embodiments of user alignment assistance, one or more windows 1418 may be displayed which contain different alignment guides 1420 to assist the user in moving the camera for capturing the second image. The windows 1418 may include live views of the scene and alignment guides 1420 that are calculated based on various objects 1422 in the image. A feature may also be available which allows the user to control the zoom factor of one or more windows 1424 in order to improve viewing of the enclosed objects 1426 and alignment guides 1428, thus facilitating camera alignment in accordance with embodiments of the presently disclosed invention.

Note that although the convergent point at a distance $D_s$ should have zero parallax, the individual image captures do not capture the convergent center as the center of their image. To obtain the convergent view, registration of the image pair after capture must be performed.

Referring to FIG. 9, image generator function 114 determines whether a camera monitoring feature is activated (step 914). A user of the device 100 may select to activate the camera monitoring feature. If the camera monitoring feature is not activated, the user may input commands for capturing a second image with settings controlled by the camera to provide the same exposure as when the first image was captured (step 916). When the user is comfortable with the camera alignment, the second image can be captured automatically or the camera can stop capturing images when it is set in a continuous image capture mode. After capture, pairs of the captured images are combined to form a stereoscopic pair (or pairs) that is (are) suitable for three-dimensional registration and compression or rendering.

If the camera monitoring feature is activated, the device 100 may analyze the currently viewed image (step 918). For example, in this mode, the device 100 continues to monitor the capture window as the user moves the camera in different positions to capture the second/last picture. The device 100 analyzes the image and determines if an ideal location has been reached and the camera is aligned (step 920). If the ideal location has not been reached and the camera is not aligned, the device 100 may adjust directional feedback relative to its current camera position (step 922). If the ideal location has not been reached and the camera is not aligned, the second image may be captured automatically when the calculated binocular distance is reached as indicated by proper alignment of the region of interest with the current live view data, and any assistance lines, such as those generated by Hough transform (step 924).

Figure 15:
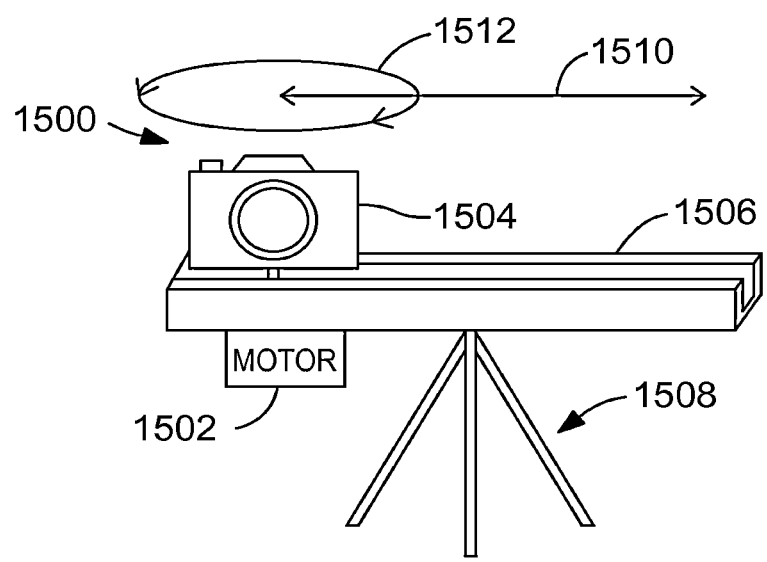
FIG. 15 is a schematic diagram illustrating an exemplary camera-positioning mechanism for automating the camera-assisted image capture procedure according to embodiments of the present invention.

Although the camera may be moved manually, the present invention may include a mechanism to automate this process. FIG. 15 is a schematic diagram of an exemplary camera-positioning mechanism 1500 for automating the camera-assisted image capture procedure according to embodiments of the present invention. Referring to FIG. 15, the mechanism 1500 may include a motorized mounting bracket 1502 which moves a camera 1504 as the camera 1504 calculates when in stereoscopic mode. The mounting bracket 1502 may connect to the camera 1504 via a suitable mount, such as, but not limited to a tripod-type mount. The bracket may rest on a tripod base 1508 or another type of base, such as a shoulder mount or handle, to be held by the user. The bracket may include a set of rails 1506 which allow the camera 1504 to move over it, but constrains the camera so that it can only move in a straight line in the horizontal direction (the direction indicated by direction arrow 1510). The camera 1504 connects to the motor controller via a digital communication interface such as USB or any other external interface. The camera 1504 may use this connection to communicate feedback information about the movement needed for the second/last image to be captured. In addition, the motor controller may control a suitable mechanism for rotating the camera 1504 in a direction indicated by direction arrow 1512.

Figure 16:
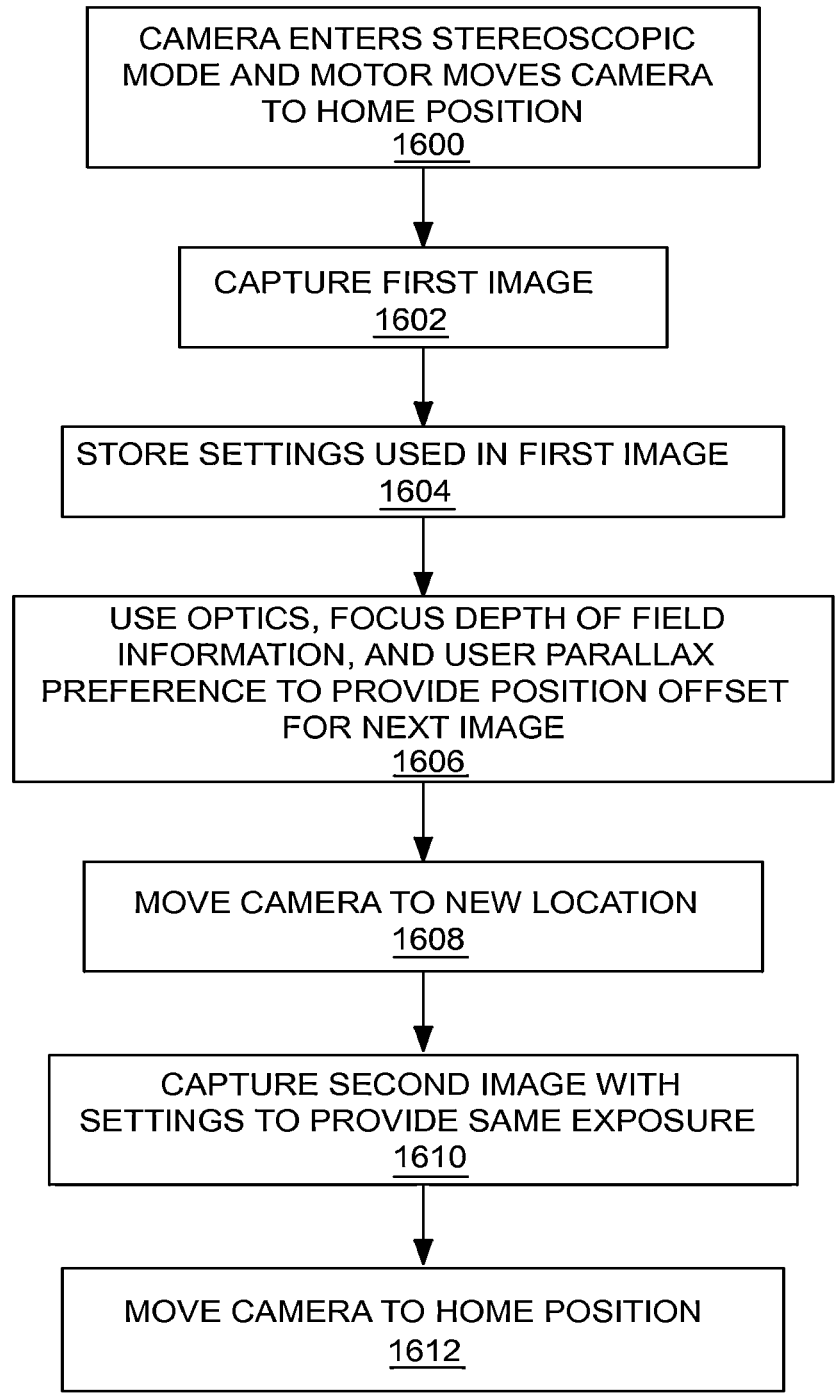
FIG. 16 illustrates an exemplary method of camera-assisted image capture using the automatic camera-positioning mechanism shown in FIG. 15 according to embodiments of the present invention.

FIG. 16 illustrates an exemplary method of camera-assisted image capture using the automatic camera-positioning mechanism 1500 shown in FIG. 15 according to embodiments of the present invention. Referring to FIG. 16, when the mechanism 1500 is to be used for the first time, the user may provide input to the camera 1504 for instructing the motor 1502 to move the camera 1504 to the "home" position (step 1600). The home position may be the farthest point of one end of the rails 1506, with the camera viewing angle perpendicular to the path of the rails 1506. The user can then adjust the camera settings and the orientation of the bracket and take a first image (step 1602). The settings used for capturing the first image (e.g., aperture and the like) may be stored for use in capturing subsequent images (step 1604).

At step 1606, the camera 1504 may use optics, focus, depth of field information, user parallax preference, and/or the like to determine position offset for the next image. For example, after the first image is captured, the camera 1504 may communicate feedback information about the movement needed for the second/last shot to the motor controller. The motor 1502 may then move the camera 1504 to a new location along the rails 1506 according to the specified distance (step 1608). When the calculated camera position is reached, the last image may be captured automatically with settings to provide the same exposure as the first image (step 1610). The camera 1504 may then be moved back to the home position (step 1612). Any of the captured images may be used to form stereoscopic pairs used to create three-dimensional images. All of the calculations required to determine the required camera movement distance are the same as those above for manual movement, although the process simplifies since the mount removes the possibility of an incorrect perspective change (due to camera toe-in) that would otherwise have to be analyzed.

Embodiments of the present invention may be implemented by a digital still camera, a video camera, a mobile phone, a smart phone, and the like. In order to provide additional context for various aspects of the present invention, FIG. 17 and the following discussion are intended to provide a brief, general description of a suitable operating environment 1700 in which various aspects of the present invention may be implemented. While the present invention is described in the general context of computer-executable instructions, such as program modules, executed by one or more computers or other devices, those skilled in the art will recognize that it can also be implemented in combination with other program modules and/or as a combination of hardware and software.

Generally, however, program modules include routines, programs, objects, components, data structures, etc. that perform particular tasks or implement particular data types. The operating environment 1700 is only one example of a suitable operating environment and is not intended to suggest any limitation as to the scope of use or functionality of the present invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

Figure 17:
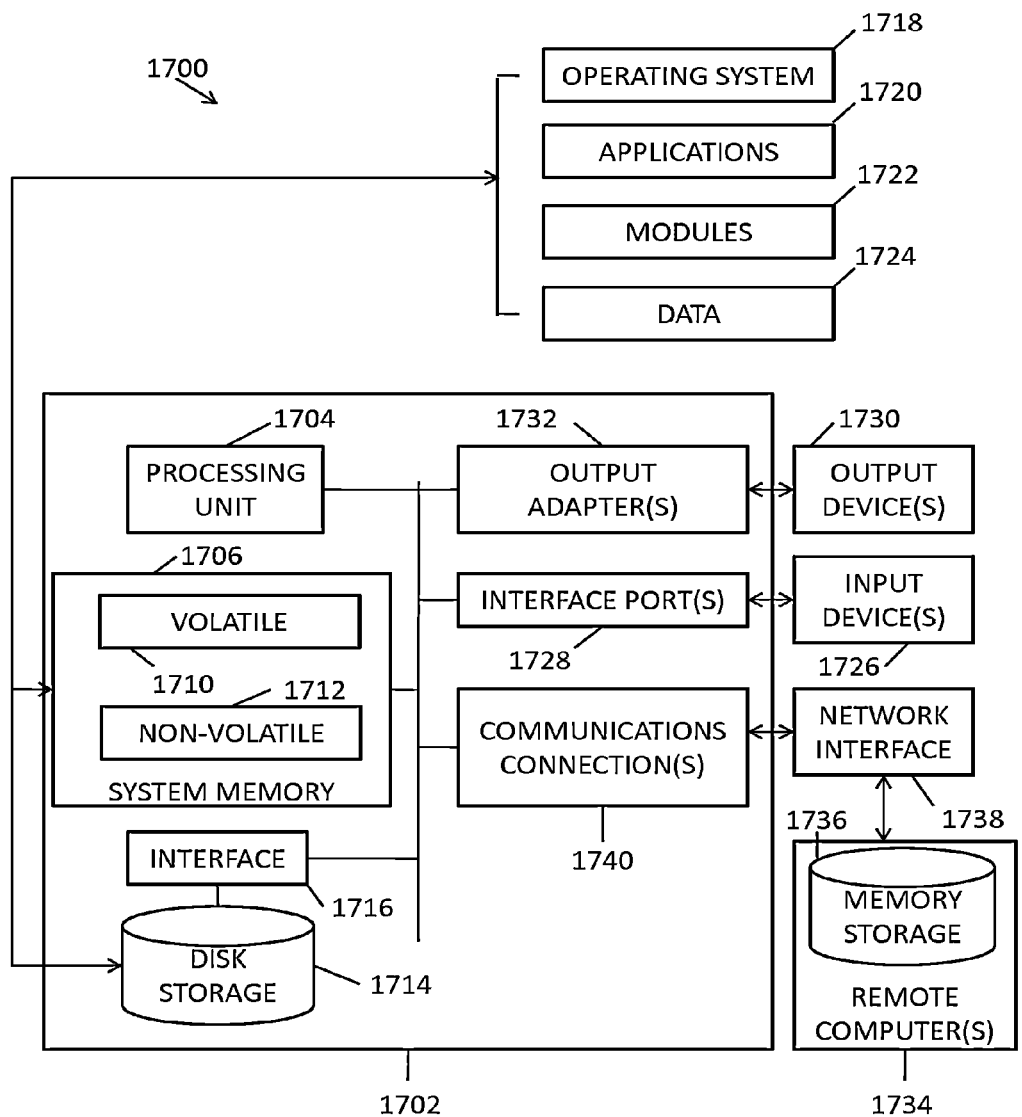
FIG. 17 illustrates an exemplary environment for implementing various aspects of the subject matter disclosed herein.

With reference to FIG. 17, an exemplary environment 1700 for implementing various aspects of the present invention includes a computer 1702. The computer 1702 includes a processing unit 1704, a system memory 1706, and a system bus 1708. The system bus 1708 couples system components including, but not limited to, the system memory 1706 to the processing unit 1704. The processing unit 1704 can be any of various available processors. Dual microprocessors and other multiprocessor architectures also can be employed as the processing unit 1704.

The system bus 1708 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1706 includes volatile memory 1710 and nonvolatile memory 1712. The basic input/output system (BIOS), containing the basic routines to transfer information between elements within the computer 1702, such as during start-up, is stored in nonvolatile memory 1712. By way of illustration, and not limitation, nonvolatile memory 1712 can include read only memory (ROM), programmable ROM (PROM), electrically programmable ROM (EPROM), electrically erasable ROM (EEPROM), or flash memory. Volatile memory 1710 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1702 also includes removable/nonremovable, volatile/nonvolatile computer storage media. FIG. 17 illustrates, for example a disk storage 1714. Disk storage 1714 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1714 to the system bus 1708, a removable or non-removable interface is typically used such as interface 1716.

It is to be appreciated that FIG. 17 describes software that acts as an intermediary between users and the basic computer resources described in suitable operating environment 1700. Such software includes an operating system 1718. Operating system 1718, which can be stored on disk storage 1714, acts to control and allocate resources of the computer system 1702. System applications 1720 take advantage of the management of resources by operating system 1718 through program modules 1722 and program data 1724 stored either in system memory 1706 or on disk storage 1714. It is to be appreciated that the present invention can be implemented with various operating systems or combinations of operating systems.

A user enters commands or information into the computer 1702 through input device(s) 1726. Input devices 1726 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1704 through the system bus 1708 via interface port(s) 1728. Interface port(s) 1728 include, for example, a serial port, a parallel port, a game port, and a universal serial bus (USB). Output device(s) 1530 use some of the same type of ports as input device(s) 1726. Thus, for example, a USB port may be used to provide input to computer 1702 and to output information from computer 1702 to an output device 1730. Output adapter 1732 is provided to illustrate that there are some output devices 1730 like monitors, speakers, and printers among other output devices 1730 that require special adapters. The output adapters 1732 include, by way of illustration and not limitation, video and sound cards that provide a means of connection between the output device 1730 and the system bus 1708. It should be noted that other devices and/or systems of devices provide both input and output capabilities such as remote computer(s) 1734.

Computer 1702 can operate in a networked environment using logical connections to one or more remote computers, such as remote computer(s) 1734. The remote computer(s) 1734 can be a personal computer, a server, a router, a network PC, a workstation, a microprocessor based appliance, a peer device or other common network node and the like, and typically includes many or all of the elements described relative to computer 1702. For purposes of brevity, only a memory storage device 1736 is illustrated with remote computer(s) 1734. Remote computer(s) 1734 is logically connected to computer 1702 through a network interface 1738 and then physically connected via communication connection 1740. Network interface 1738 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1740 refers to the hardware/software employed to connect the network interface 1738 to the bus 1708. While communication connection 1740 is shown for illustrative clarity inside computer 1702, it can also be external to computer 1702. The hardware/software necessary for connection to the network interface 1738 includes, for exemplary purposes only, internal and external technologies such as, modems including regular telephone grade modems, cable modems and DSL modems, ISDN adapters, and Ethernet cards.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the present invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An apparatus for selecting an image capture position to generate a three-dimensional image, the apparatus comprising:
    at least one image capture device, the capture device capable of capturing a real-time image of a scene;
    at least one processor, the processor for:
        applying edge sharpness criteria to identify the first template region to generate a set of first guides associated with a first still image of a scene wherein the set of first guides includes at least one of a first horizontal guide, a first vertical guide, and a first perspective guide;
        displaying a real-time image of the scene on a display;
        applying a Hough or similar transformation to identify a set of second guides associated with the real-time image wherein the set of second guides includes at least one of a second horizontal, vertical, and perspective guide; and
        displaying the first and second guides on the display for guiding selection of a position of the image capture device to capture a second still image of the scene for pairing the first and second still images to generate a three-dimensional image.

2. The method of claim 1 wherein determining a plurality of first guides comprises providing at least one window that displays a live-view of the scene; and
    wherein determining a plurality of second guides comprises determining at least one guide based on objects in the previously captured image.

3. The method of claim 1 further comprising capturing the first still image using the image capture device, and
    wherein the displaying of the real-time image of the scene occurs subsequent to the step of capturing the first still image.

4. The method of claim 3 further comprising receiving, at the image capture device, input for entering a stereoscopic mode.

5. The method of claim 4 further comprising:
    storing settings of the image capture device used when the first still image is captured; and
    capturing the second or other still images using the stored settings.

6. The method of claim 1 further comprising dynamically changing the displayed real-time image of the scene as the position of the image capture device changes with respect to the scene.

7. The method of claim 1 further comprising dynamically changing positioning of the first and second guides with respect to one another on the display as the position of the image capture device changes with respect to the scene.

8. The method of claim 1 further comprising automatically or manually capturing the second still image, or stopping capturing images when in continuous capture mode, when the first and second guides become aligned.

9. The method of claim 8 wherein the first and second guides become aligned when the image capture device is positioned using such predetermined criteria for pairing the first and second/last still images as the stereoscopic pair of the three-dimensional image.

10. A method for positioning an image capture device for generating a three-dimensional image, the method comprising:
    using at least one processor for:
    applying edge sharpness criteria to identify the first template region to generate a set of first guides associated with a first still image of a scene wherein the set of first guides includes at least one of a first horizontal guide, a first vertical guide, and a first perspective guide;
    mechanically-moving the image capture device; capturing at least one real-time image of the scene during movement of the image capture device;
    applying a Hough or similar transformation to identify a set of second guides associated with the real-time image wherein the set of second guides includes at least one of a second horizontal, vertical, and perspective guide; and
    mechanically-positioning the image capture device to a predetermined position where the guides are aligned to capture a second still image of the scene, as well as any images in between, for pairing any of the captured images as a stereoscopic pair of a three-dimensional image.

11. The method of claim 10 comprising providing a motorized device configured to controllably move the image capture device.

\* \* \* \* \*